United States Patent [19]
Takahashi et al.

[11] Patent Number: 5,920,560
[45] Date of Patent: Jul. 6, 1999

[54] MULTI-CONNECTION MANAGEMENT METHOD AND APPARATUS FOR SWITCH SYSTEM

[75] Inventors: Eiichiro Takahashi; Fumio Hirase, both of Kawasaki, Japan

[73] Assignee: Fujitsu Limited, Kanagawa, Japan

[21] Appl. No.: 08/606,009

[22] Filed: Feb. 12, 1996

[30] Foreign Application Priority Data

Aug. 23, 1995 [JP] Japan .................................. 7-214975
Sep. 7, 1995 [JP] Japan .................................. 7-230547

[51] Int. Cl.⁶ .................................................. H04J 3/24
[52] U.S. Cl. ........................ 370/395; 370/270; 370/381; 370/401
[58] Field of Search .................................. 370/498, 320, 370/395, 397, 399, 232, 237, 352, 270, 259, 358, 401, 363, 368, 371, 374, 381, 539

[56] References Cited

U.S. PATENT DOCUMENTS

| | | | |
|---|---|---|---|
| 4,713,806 | 12/1987 | Oberlander et al. ..................... | 370/358 |
| 5,062,103 | 10/1991 | Davidson et al. ....................... | 370/270 |
| 5,280,476 | 1/1994 | Kojima et al. .......................... | 370/397 |
| 5,331,131 | 7/1994 | Tanabe et al. .......................... | 370/397 |
| 5,504,742 | 4/1996 | Kakuma et al. ........................ | 370/399 |
| 5,519,689 | 5/1996 | Kim ........................................ | 370/232 |
| 5,550,816 | 8/1996 | Hardwick et al. ...................... | 370/397 |
| 5,623,605 | 4/1997 | Keshav et al. .......................... | 370/401 |

*Primary Examiner*—Douglas W. Olms
*Assistant Examiner*—Shick Hom
*Attorney, Agent, or Firm*—Helgott & Karas P.C.

[57] ABSTRACT

In one embodiment of a multi-connection management method, a management area is prepared for each of the interfaces. A call control memory stores the management information of a leaf interface, statuses of connections, leaf interface information and link information. A whole leaf interface management area is stored with the link information of the leaf management areas. The leaf management area for each interface is stored with the information of the corresponding interface and the link information. In another embodiment, connection status for a fixed-connection communication of a multicast is confirmed. This includes a communication controller that receives a status confirmation demand message sent by terminals and demands a multicast server for information collection, if the message is the status confirmation demand message which is effective for the protocol regulations. If the response information for the status of each line accommodator, which is collected and gathered by the multicast server, is returned from the multicast server to the communication control as a result of the information collection demand, the communication controller edits a connection status notice message on the basis of the response information and sends a connection notice message to the multicast server to return it to the terminals through the line accommodators.

50 Claims, 31 Drawing Sheets

F I G. 5
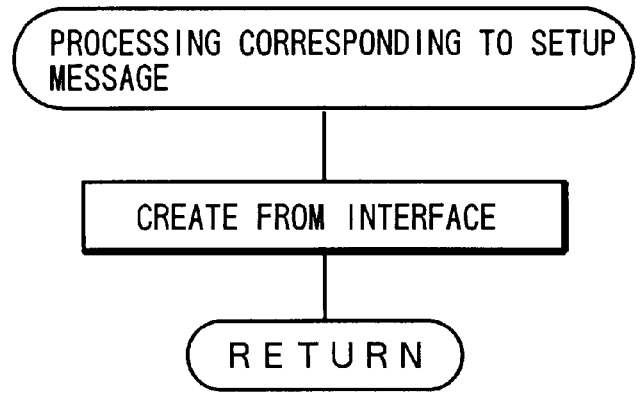
F I G. 6
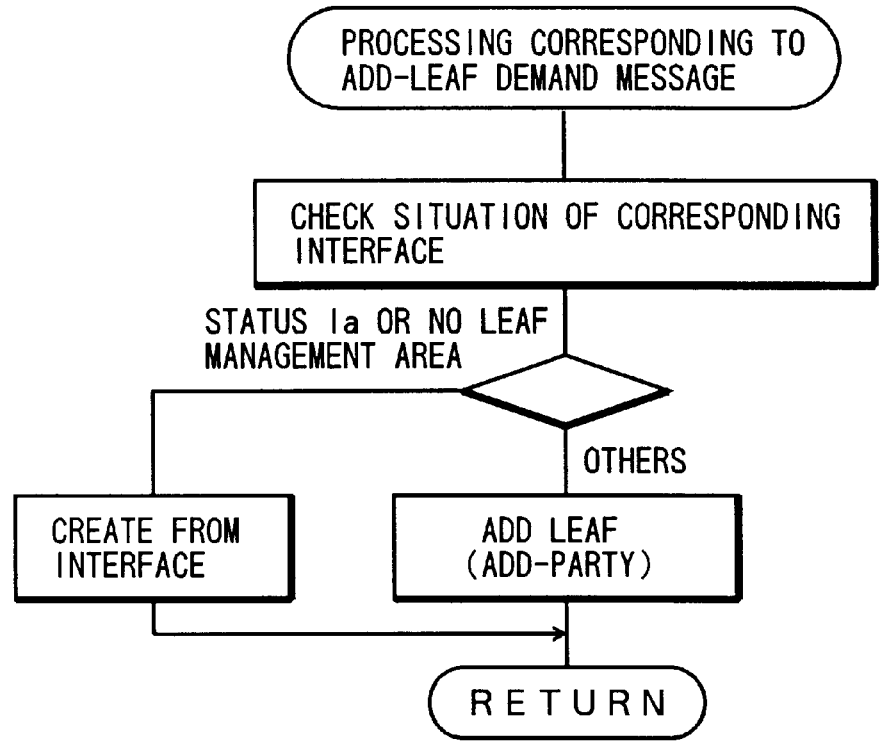

FIG. 20 PRIOR ART

| PROCESSING DEMAND (INPUT) | STATUS OF CORRESPONDING INTERFACE | STATUSES OF OTHER INTERFACES | STATUS OF OTHER LEAVES ON INTERFACE | PROCESSING (OUTPUT) TO BE EXECUTED |
|---|---|---|---|---|
| SETUP | Ia OR NO INTERFACE | NO RELATION | NO RELATION | CREATE FROM INTERFACE |
| ADD PARTY (DEMAND ADD-LEAF) | Ia OR NO INTERFACE | NO RELATION | NO RELATION | CREATE FROM INTERFACE |
| | Ie | NO RELATION | NO RELATION | ADD PARTY |
| | Ie | NO RELATION | Ld NO > 1 | DROP PARTY |
| DROP PARTY (DEMAND DELETE-LEAF) | Ie | Ic OR Ie | Ld NO < 1 | RELEASE BY DELETION FOR EACH INTERFACE |
| | Ie | If OR Ig | Ld NO < 1 | DELETE FOR EACH CALL |
| | Ig | NO RELATION | NO RELATION | DO NOTHING |
| RELEASE (DEMAND INTERFACE DELETE) | Ie | Ie OR Ic | Lc = 0 AND Ld ≠ 0 | RELEASE BY DELETION FOR EACH INTERFACE |
| | Ie | NO RELATION | Lc = 1 | REDIAL SETUP |
| | Ie | If OR Ig | NO RELATION | DELETE FOR EACH CALL |
| | Ig | NO RELATION | NO RELATION | DO NOTHING |

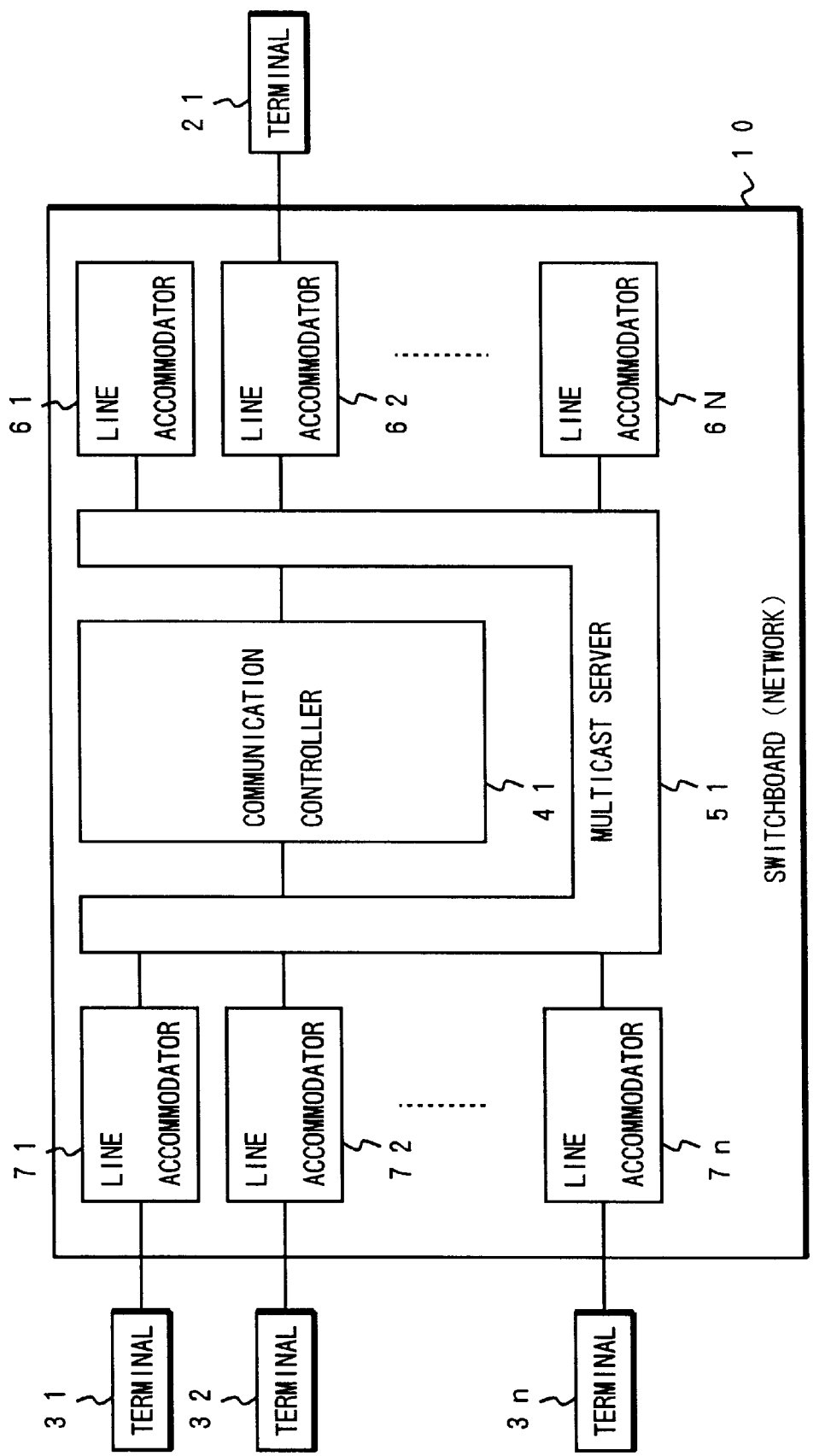

| MULTICAST PVC IDENTIFIER | CALL-IN TERMINAL CONNECTION IDENTIFIER (FRAME RELAY : DLCI)/(ATM : VPI/VCI) | |
|---|---|---|
| | CALL-OUT TERMINAL NO. (NORMALLY:CALL-OUT ADDRESS) | IMPORTANCE |
| PVC#1 | 1-4401-1234567 | ○ (IMPORTANT) |
| PVC#2 | 0-4403-7654321 | ○ (IMPORTANT) |
| PVC#3 | 0081-3-3216-1234 | — |
| ⋮ | ⋮ | ⋮ |
| PVC#n | 0081-45-888-7777 | — |

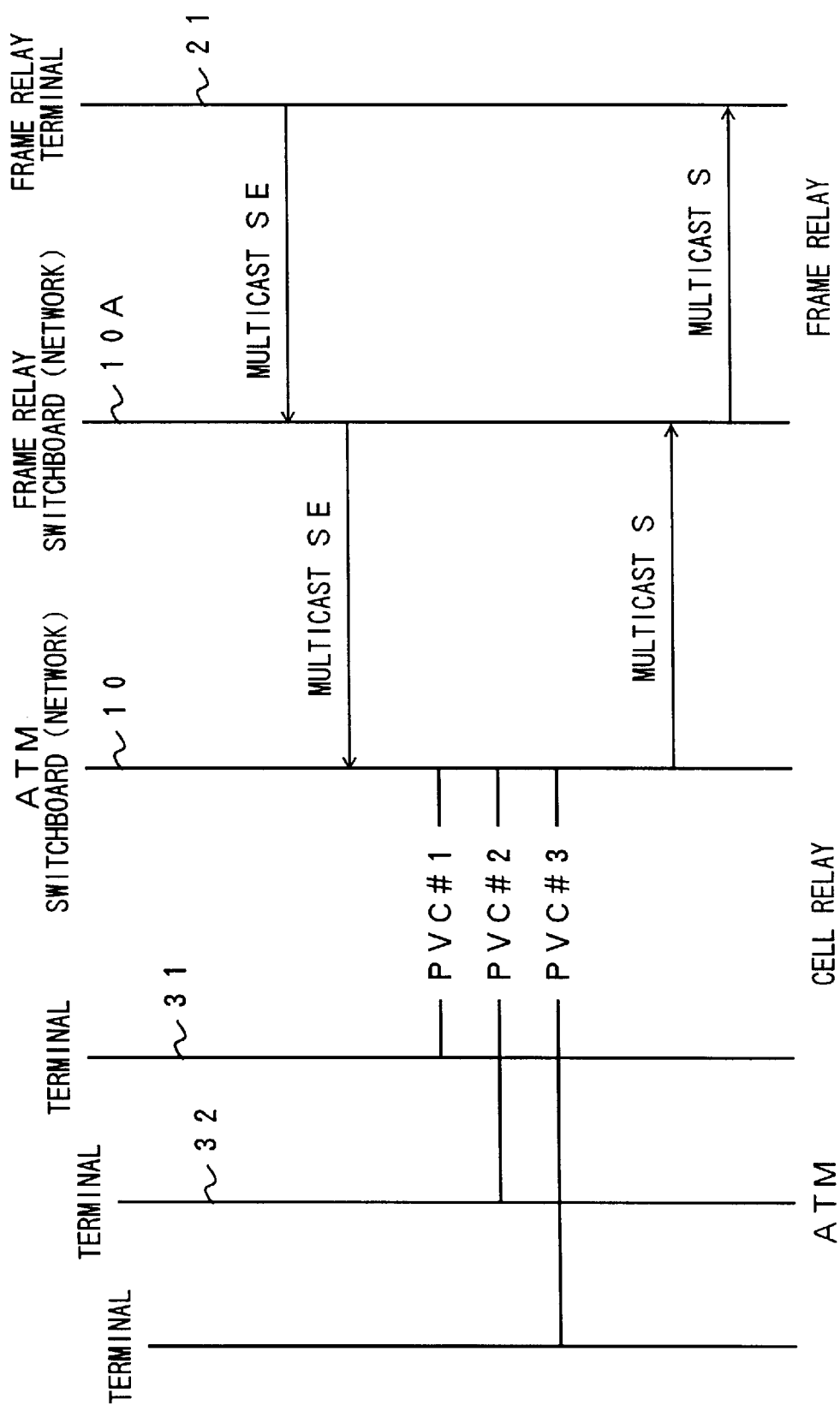

MULTI-CONNECTION MANAGEMENT METHOD AND APPARATUS FOR SWITCH SYSTEM

BACKGROUND OF THE INVENTION

The present invention relates to a switch system using the ATM (Asynchronous Transfer Mode) switch-board, more particularly, to a multi-connection management method and apparatus for the switch system for managing the multi-connections to set a plurality of connections simultaneously between a call from an end user and one or more other end users.

The present invention further relates to a high speed packet communication system for segmenting communication data to relay-transfer them in a network as in a frame relay or cell relay and, more particularly, to a multicast connection status confirmation method and apparatus for confirming connection statuses of fixed connection in multicast services such as a pair of plural broadcasting communications or a plurality of pairs of plural broadcasting communications, as provided as network services.

First of all, let one connection between one end user and another be defined as the "connection". Between one end user and one or more other end users, there exists a call for setting a plurality of connections simultaneously. These plural connections will be defined as the "multi-connection".

A plurality of multi-connections may exist simultaneously, and there two or more calls may set a plurality of connections simultaneously for the same end user. At this time, an interface for managing in a bundle a plurality of connections to be connected with the same end user through one multi-connection will be defined as the "management unit" for a plurality of connections.

Although the multi-connection is executed in the switchboard of the prior art, too, especially the ATM switchboard for the multimedia communications is enabled to set a considerable number of connections with one call for one end user by the point-to-multipoint or the like.

The number of leaves (LEAF) per call, as can be defined in the format of a message, is such a number (e.g., about 32,000) as can be defined by (3 bytes length÷2). The leaf number can desirably manage a connection of about 1,000 leaves and suppress the processing delay as much as possible, even if it fails to reach the above-specified number.

Because of a small number of connections, as a matter of fact, the connections are managed in the prior art by referring to a memory for managing the connections directly.

One example of the memory construction for realizing the point-to-multipoint connection by the prior art, as shown in FIG. 11, is exemplified in FIG. 12. For the processing routines for the various demands in the point-to-multipoint connection, moreover, the routine shown in FIG. 20 is determined by the routines of FIGS. 13 to 19.

The point-to-multipoint connected switch system, as shown in FIG. 11, includes a switchboard SW, first to third user network interfaces UNI1 to UNI3, a central processing unit CPU and a memory M. In FIG. 11, there is shown in this case a one-way connection service from an outgoing side (e.g., outgoing terminal), i.e., a root (ROOT) to six incoming sides (e.g., incoming terminals), i.e., a leaf a to a leaf f (LEAFa to LEAFf).

The memory M includes a call control memory 1 and connection control memories 2 to 7.

The call control memory 1 manages the call root ROOT of the point-to-multipoint. The connection control memories 2 to 7 manage the individual connections of the leaf a (LEAFa) to the leaf f (LEAFf). Over each of the connection control memories 2 to 7, there are managed the state (i.e., the party-state) of each leaf (LEAF), the number of states of the leaf (LEAF) on the interface to which each leaf (LEAF) belongs, such as the number of active leaves (active LEAF) and so on. Moreover, the state (i.e., the link-state) of the interface of each under network interface UNI is given a value equal to that of the connection control memories 2 to 7 of each leaf (LEAF) on the corresponding user network interface.

If all the states of the connections at some time in FIG. 11 are active, the individual data of FIG. 12 are expressed, as follows:

Number of State Ie on Call Control Memory 1=2; Outgoing and Incoming Party State on Connection Control Memories 2 to 7=Ld (active);

Link State on Connection Control Memories 2 to 7=Ie (active); and

*1: La=Lb=Lc=Le=Lf=0 and Ld (active)=3 on Connection Control Memories 2 to 7.

The processing determination logic at this time is schematically shown in FIG. 13. First of all, if a delete demand (DROP-PARTY) of the leaf a (LEAFa) is given from the root ROOT side, the call control memory 1 for controlling that call is decided (although the description of this decision logic is omitted). Next, a processing c for the delete demand (DROP-PARTY) is started on the basis of a message. At this step c, the processing is decided (by using the processing decide logic, as shown in FIG. 20) with reference to the data of FIG. 12, as shown in FIG. 16. In this case, the routine transfers to FIG. 17 for the processing of executing the "DROP-PARTY".

The corresponding connection control memory is released by the processing at the time of the delete demand (DROP-PARTY). In accordance with this, the data, as shown at *1 in FIG. 12, have to be changed in the connection control memory of another leaf (LEAF) on the corresponding interface. This makes it necessary to find out another connection control memory on the corresponding interface by tracing all the connection control memories 2 to 7 from the call control memory 1 of FIG. 12.

Thus, the prior art is required to trace the memories simply so that the tracing steps will increase to delay the processing as the leaf (LEAF) number of the multi-point increases.

When a demand occurs for one interface of the multi-connection, the processing has to be executed according to the situation of the connection in the interface. In this case, the prior art has to decide the processing by searching the management memory of the connection of the corresponding interface from the management memory of the connection being managed by the call, so that a number of steps are required for determining a processing.

If the number of connections of one interface is set at 1,000, for example, the statuses of the 1,000 connections have to be examined to examine the situation of the leaf (LEAF) on that interface. When some operation is to be performed upon only one connection, a corresponding one has to be searched from the 1,000 connection management memories.

For the one point-to-multipoint, moreover, it is necessary that one to about 32,000 leaves (LEAF) can be controlled. The memory using efficiency might drop if the numbers of the interfaces and the leaves (LEAF) in each point-to-multipoint could not be linearly managed within that range.

SUMMARY OF THE INVENTION

A first object of the present invention is to provide a multi-connection management method and apparatus in a switch system, which is enabled to promptly decide a processing for a given demand and to make the connection management highly efficient by properly arranging a proper management information in the multi-connection to perform the connection management.

Here, the following two systems are known as the high speed packet communication system for segmenting communication data and relay-transferring them in a network:

(1) Frame Relay

This frame relay is a relay type packet mode communication system for the frame of data link layer and performs the communications by relaying the data at the frame level of the data link layer; and (2) Cell Relay This cell relay is the relay type packet mode communication system for cells of physical layer, as known as the ATM (Asynchronous Transfer Mode) switch system, and performs the communications by relaying the data at the cell level of the physical layer.

Both of these high speed packet communication systems by the frame relay and the cell relay (i.e., ATM) are already known as the high-speed/wide-band communication techniques.

Both the frame relay and the cell relay (ATM) are new techniques, and the multicast services such as the one pair of plurality, i.e., one pair n (1:n) broadcasting communications or a plurality of pairs plural, i.e., n pairs n (n:n) broadcasting communications are not realized yet at the present stage. What is regulated in the standardizations such as the international recommendations of the communications by the frame relay and the cell relay (ATM) is the system for the multicast type communications.

On the other hand, one mode of the services in the data communication system is a fixed connection service in which the connections are set in advance in a fixed manner to perform the communications in the set connections. These typical fixed-connection services are called the "PVC (Permanent Virtual Connection". Other fixed connection services are the semi-fixed connection services, as called the SPC (Semi-Permanent Virtual Connection) having the incoming notice procedure in the ISDN (Integrated Services Digital Network). These are a kind of fixed connection services, and this service mode of SPC will be included when the phrase "fixed-connection" is used here.

In the relay type network services of the aforementioned frame relay and cell relay, the PVC status confirmation system is essential when the fixed connection communications such as the PVC communications are to be performed. This also applies to the case of the multicast type fixed connection broadcasting communications such as the multicast PVC broadcasting communications.

Without these status confirmation systems, it is impossible to grasp the status of the fixed connections such as the breakage of the connections.

Of the PVC status confirmation procedures in the existing international recommendations, however, there are regulated the two procedures of the "status notice of one PVC" and the "batch status notice of all the contracted PVC" but not the PVC status confirmation procedure relating to the multicast services.

A second object of the present invention is to provide a multicast connection status confirmation method and apparatus for confirming the connection statuses when the multicast fixed connection communications are to be executed in the network services of relay type such as the frame relay or the cell relay.

As means for achieving the first object of the present invention, there is provided a multi-connection management method in a switch system for managing the multi-connections in a switch system, comprising:

preparing management areas for each multi-connection interface; and managing calls with said management areas.

According to the present invention, a second multi-connection management method in a switch system for managing the multi-connections in a switch system, comprises:

holding statuses for each connection and managing said statuses;

preparing, for each connection, management areas for managing the various statuses of said connections and the number of connections in each of said statuses; and managing said connections with two points of the statuses for each of said statuses and the number of said statuses of each connection of each of said interfaces.

According to the present invention, a third multi-connection management method in a switch system for managing the multi-connections in a switch system, comprises:

preparing dedicated for managing the number of statuses of each interface by making said interface into a virtual connection and giving a status to said interface; and managing the multi-connection interfaces by managing the number of interfaces of each of said statuses.

According to the present invention, a fourth multi-connection management method in a switch system for managing the multi-connections in a switch system, comprises:

preparing a plurality of connection management memories for managing each connecting including the statuses of the multi-connections and one call control memory for controlling calls; and managing said connection management memories commonly by the entire system and managing the same by said call control memory.

According to the present invention, a fifth multi-connection management method in a switch system for managing the multi-connections in a switch system, comprises:

preparing connection status control memories for managing the statuses of said multi-connections, a connection control memory linked to said connection status control memories for managing the information of the connection other than a status number, and one call control memory for controlling calls; and managing said connection status control memories commonly by the entire system and managing the same by said call control memory.

According to the present invention, a sixth multi-connection management method in a switch system for managing the multi-connections in a switch system, comprises:

preparing, for each multi-connection interface, management areas for managing interfaces and one call control memory for controlling calls; and managing said management areas commonly by the entire system and managing the same by said call control memory.

According to the present invention, a seventh multi-connection management apparatus for a switch system, comprises:

management information storage means provided for each of multi-connection interfaces for storing management information; and call management means for managing the multi-connections by managing calls by said management information storage means.

According to the present invention, an eighth multi-connection management apparatus for a switch system, comprises:

connection status hold means provided for each connection for holding status information;

status management means for managing the status information which is held by said connection status hold means; and connection management means for managing the multi-connections with both the status of each connection and each status number of each connection of each interface.

According to the present invention, a ninth multi-connection management apparatus for a switch system, comprises:

status number management information storage means for storing the status number management information of each interface by making said interface into a virtual connection and by giving a status to said interface; and interface management means for managing the multi-connection interfaces with the interface number for each status according to said status number management information.

According to the present invention, a tenth A multi-connection management apparatus for a switch system, comprises:

a plurality of connection management information memory means for storing connection management information for managing each of multi-connections including their statuses;

one call control information memory means for storing call control information for controlling calls;

connection management information management means for managing said connection management information storage means commonly by the entire system; and memory management means for managing said connection management information memory means by said call control information memory means.

According to the present invention, an eleventh multi-connection management apparatus for a switch system, comprises:

connection status control information memory means for storing connection status control information for managing the statuses of multi-connections;

connection control information memory means linked to said connection status control information memory means for storing connection control information for managing the information of the connection other than a status number;

one call control information memory means for storing call control information for controlling calls;

connection status control information management means for managing said connection status control information memory means commonly by the entire system; and memory management means for managing said connection status control information memory means by said call control information memory means.

According to the present invention, a twelfth multi-connection management apparatus for a switch system, comprises:

interface management information storage means provided for each of multi-connection interfaces for storing interface management information for managing the interface;

one call control information memory means for storing call control information for controlling calls;

interface information management means for managing said interface management information storage means commonly by the entire system; and memory management means for managing said interface management information storage means by said call control information memory means.

In the multi-connection management method and apparatus in the switch system according to the present invention, for the management of multi-connections in the switch system, the number of interfaces for a call is not limited by preparing a management area for each interface of the multi-connections to manage the calls by the management area.

If the statuses are held for individual connections and managed, and if a management area is prepared for managing the various statuses of the connections at the unit of the interface and the number of connections in the individual statuses so that the connections may be managed at the two points of the statuses of the individual connections and the number of the statuses of the connections of the individual interfaces, the statuses of all the connections can be easily grasped for the individual interfaces.

If, moreover, a management area as dedicated to the management of the status number of the interfaces while giving the statuses to the individual interfaces so that the interface of the multi-connection may be managed by managing the number of interfaces of the aforementioned individual statuses, the statuses of all the interfaces can be easily grasped at the unit of call.

If, moreover, one call control memory is prepared for controlling a plurality of connection management memories and calls for managing the individual connections containing the statuses of the multi-connections so that the connection management memories may be commonly managed by the whole system and by the call control memories, the connection control memories can be managed by the whole system to easily retrieve the individual connection control memories.

If, still moreover, a connection status control memory for managing the statuses of the multi-connections, a connection control memory for managing the information of the connection other than the status number by linking to the connection status control memory, and one call control memory for controlling calls are prepared so that the connection status control memories may be commonly managed by the whole system and by the call control memory, the connection status control memories can be managed by the whole system and can be easily retrieved.

If, furthermore, a management area for managing each interface of the multi-connections and one call control memory for controlling calls are prepared so that the management area may be commonly managed by the whole system and by the call control memory, the management area of each interface of the multi-connections can be managed by the whole system and can be easily retrieved.

In the multi-connection management method and apparatus in the switch system according to the present invention, therefore, the processing to be executed can be easily decided at the unit of all or at the unit of interface when some event occurs in the multi-connections. Since the retrieving method is simplified by making the various management areas common, moreover, it is possible to easily increase/decrease the interface number of each call, manage the statuses of the interfaces, increase/decrease the number of leaves (LEAF) on each interface and extract the connection control memories and to use the individual management areas effectively.

As means for achieving the second object of the present invention, there is provided a multicast connection status confirmation method for multicast services for broadcast communications, in which at least one of link connections of fixed connection is a plurality over a high speed packet communication system for segmenting communication data and relay-transferring them in a network, comprising:

- defining a connection status notice message, in which the status information of all the outgoing link connections under a multicast are enumerated; and
- confirming the connection status of each of the link connections of the multicast.

Said high speed communication system may be a frame relay network system or a cell relay network system.

The connection status confirmation by the connection status notice message of each link connection of the multicast may be applied to the link connection of a user network interface, the link connection of an inter-network interface or an inter-working function between a frame relay network and a cell relay network.

The link connections of fixed connection may include link connections of semi-fixed connection.

According to the present invention, a second multicast connection status confirmation method for multicast services for broadcast communications, in which at least one of link connections of fixed connection is a plurality over a high speed packet communication system for segmenting communication data and relay-transferring them in a network, comprises:

- defining a connection status notice message including the status information, in which the status is activated only when all the outgoing link connections under a multicast are active; and
- confirming the connection status of the link connections of the multicast.

Said high speed communication system may be a frame relay network system or a cell relay network system.

The connection status confirmation by the connection status notice message of each link connection of the multicast may applied to the link connection of a user network interface, the link connection of an inter-network interface or an inter-working function between a frame relay network and a cell relay network.

The link connections of fixed connection may include link connections of semi-fixed connection.

According to the present invention, a third multicast connection status confirmation method for multicast services for broadcast communications, in which at least one of link connections of fixed connection is a plurality over a high speed packet communication system for segmenting communication data and relay-transferring them in a network, comprises:

- registering at least one of important outgoing ones of outgoing link connections under a multicast, in advance, at the time of registering a multicast contract;
- defining a connection status notice message including the status information, in which the status is activated only when all of said important ones of the outgoing link connections under a multicast are active; and
- confirming the connection status of the link connections of the multicast.

Said high speed communication system may be a frame relay network system or a cell relay network system.

The connection status confirmation by the connection status notice message of each link connection of the multicast may be applied to the link connection of a user network interface, the link connection of an inter-network interface or an inter-working function between a frame relay network and a cell relay network.

The link connections of fixed connection may include link connections of semi-fixed connection.

According to the present invention, there is provided a multicast connection status confirmation apparatus for a high speed packet communication system for providing services including multicast services for broadcast communications, in which at least one of link connections of fixed connection is a plurality by a high speed packet communication for segmenting communication data and relay-transferring them in a network, comprising:

- status collection means for collecting the status information of all the outgoing link connections under the multicast in response to a connection status confirmation demand message;
- message edition means for editing the connection status notice message, in which the status informations of all the outgoing link connections under the multicast are enumerated, on the basis of the collection result by said status collection means; and
- transfer control means for receiving said connection status confirmation demand message from said a connection status confirmation demanding connection and feeding it to said status collection means and for returning the connection status notice message, which is edited by said message edition means, to said connection status confirmation demanding connection.

Said high speed communication system may be a frame relay network system or a cell relay network system.

Said link connection may be a link connection of a user network interface, a link connection of an inter-network interface or a link connection of by an inter-working function between a frame relay network and a cell relay network.

The link connections of fixed connection may include link connections of semi-fixed connection.

According to the present invention, a second multicast connection status confirmation apparatus for a high speed packet communication system for providing services including multicast services for broadcast communications, in which at least one of link connections of fixed connection is a plurality by a high speed packet communication for segmenting communication data and relay-transferring them in a network, comprises:

- status collection means for collecting the status information of all the outgoing link connections under the multicast in response to a connection status confirmation demand message;
- message edition means for editing the connection status notice message including the status information, in which the status is activated only when all the outgoing link connections under the multicast are active, on the basis of the collection result by said status collection means; and
- transfer control means for receiving said connection status confirmation demand message from said a connection status confirmation demanding connection and feeding it to said status collection means and for returning the connection status notice message, which is edited by said message edition means, to said connection status confirmation demanding connection.

Said high speed communication system may be a frame relay network system or a cell relay network system.

Said like connection may be a link connection of a user network interface, a link connection of an inter-network interface or a link connection of by an inter-working function between a frame relay network and a cell relay network.

The link connections of fixed connection may include link connections of semi-fixed connection.

According to the present invention, a third multicast connection status confirmation apparatus for a high speed packet communication system for providing services including multicast services for broadcast communications, in which at least one of link connections of fixed connection is a plurality by a high speed packet communication for segmenting communication data and relay-transferring them in a network, comprises:

important outgoing side registration means for registering in advance at least one of important ones of the outgoing link connections under a multicast;

status collection means for collecting the status information of all the outgoing link connections under the multicast in response to a connection status confirmation demand message;

message edition means for editing the connection status notice message including the status information, in which the status is activated only when all of said at least one of said registered important ones of the outgoing link connections under the multicast are active, on the basis of the collection result by said status collection means; and transfer control means for receiving said connection status confirmation demand message from said a connection status confirmation demanding connection and feeding it to said status collection means and for returning the connection status notice message, which is edited by said message edition means, to said connection status confirmation demanding connection.

Said high speed communication system may be a frame relay network system or a cell relay network system.

Said link connection may be a link connection of a user network interface, a link connection of an inter-network interface or a link connection of by an inter-working function between a frame relay network and a cell relay network.

The link connections of fixed connection may include link connections of semi-fixed connection.

BRIEF DESCRIPTION OF THE DRAWINGS

FIG. 5 is a flow chart showing a processing corresponding to a setup message of the processing decision logic according to the system of FIG. 1;

FIG. 6 is a flow chart showing a processing corresponding to an add-leaf demand message of the processing decision logic according to the system of FIG. 1;

FIG. 20 is a diagram showing a list of the processing decision logic according to the switch system of the prior art;

FIG. 21 is a block diagram showing a construction of a switch system according to a first embodiment for confirming a multicast status;

FIG. 39 is a diagram for explaining a multicast status confirmation sequence of the service inter-work according to the system of FIG. 38.

DESCRIPTION OF THE PREFERRED EMBODIMENTS

A switch system according to the present invention will be described in the following in connection with its preferred embodiments with reference to the accompanying drawings.
Embodiment 1

Figure 1:
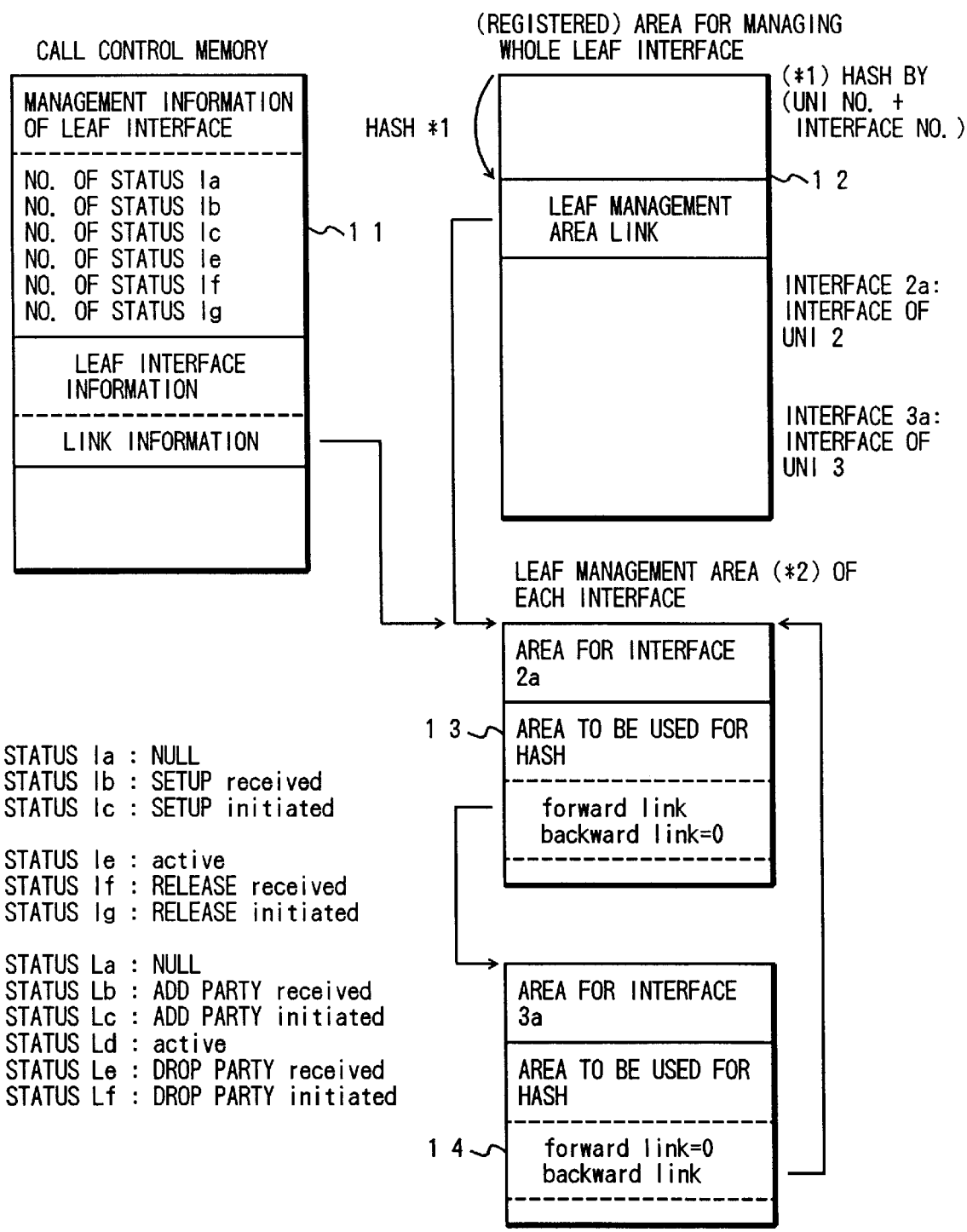
FIG. 1 is a schematic block diagram showing relations among a call control memory, a whole leaf interface managing area and a leaf management area of each interface, as forming an essential portion of a switch system according to an embodiment of the present invention.
Figure 2:
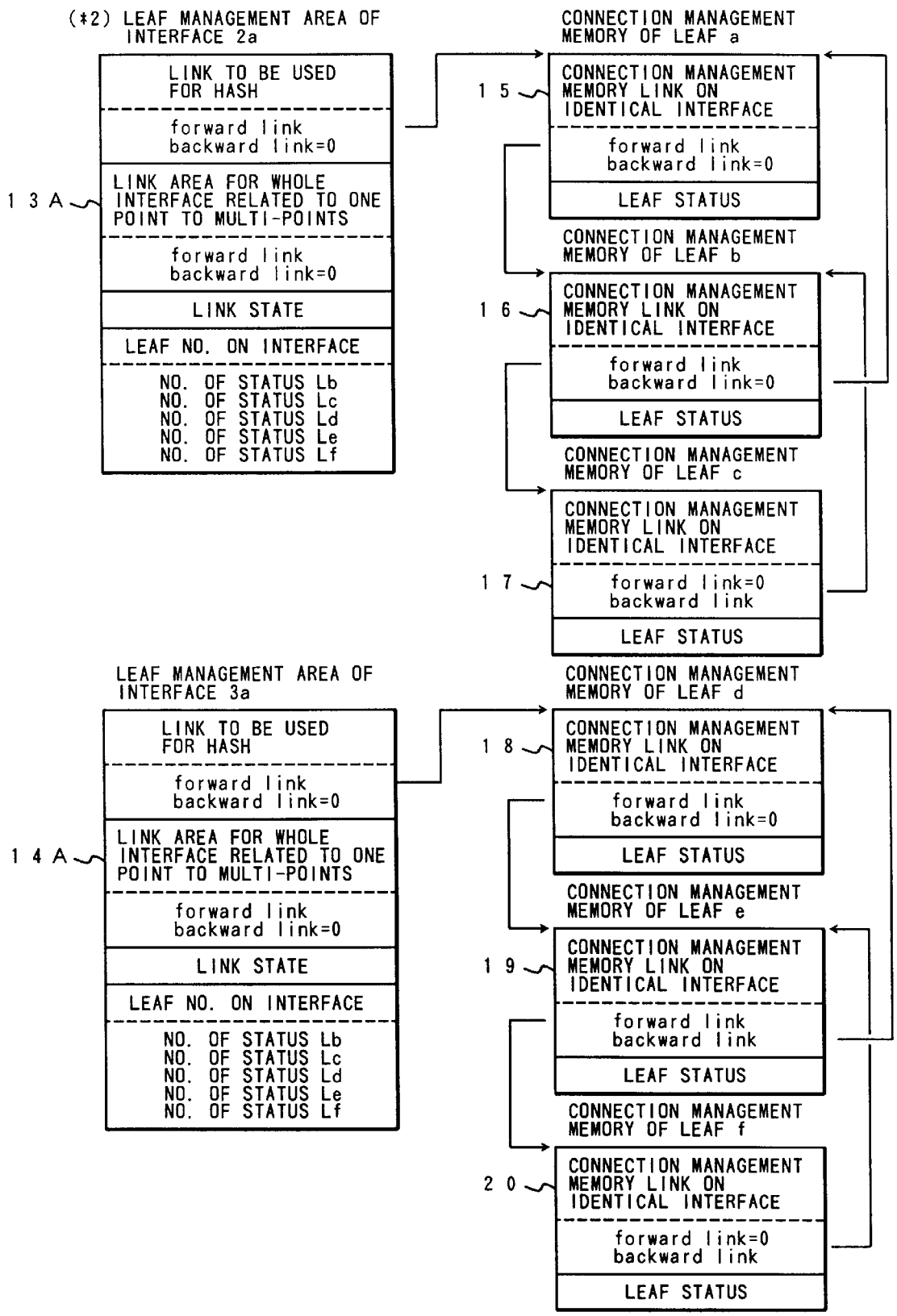
FIG. 2 is a schematic block diagram showing relations between leaf management areas and leaf connection management memories of an interface according to the system of FIG. 1.
Figure 3:
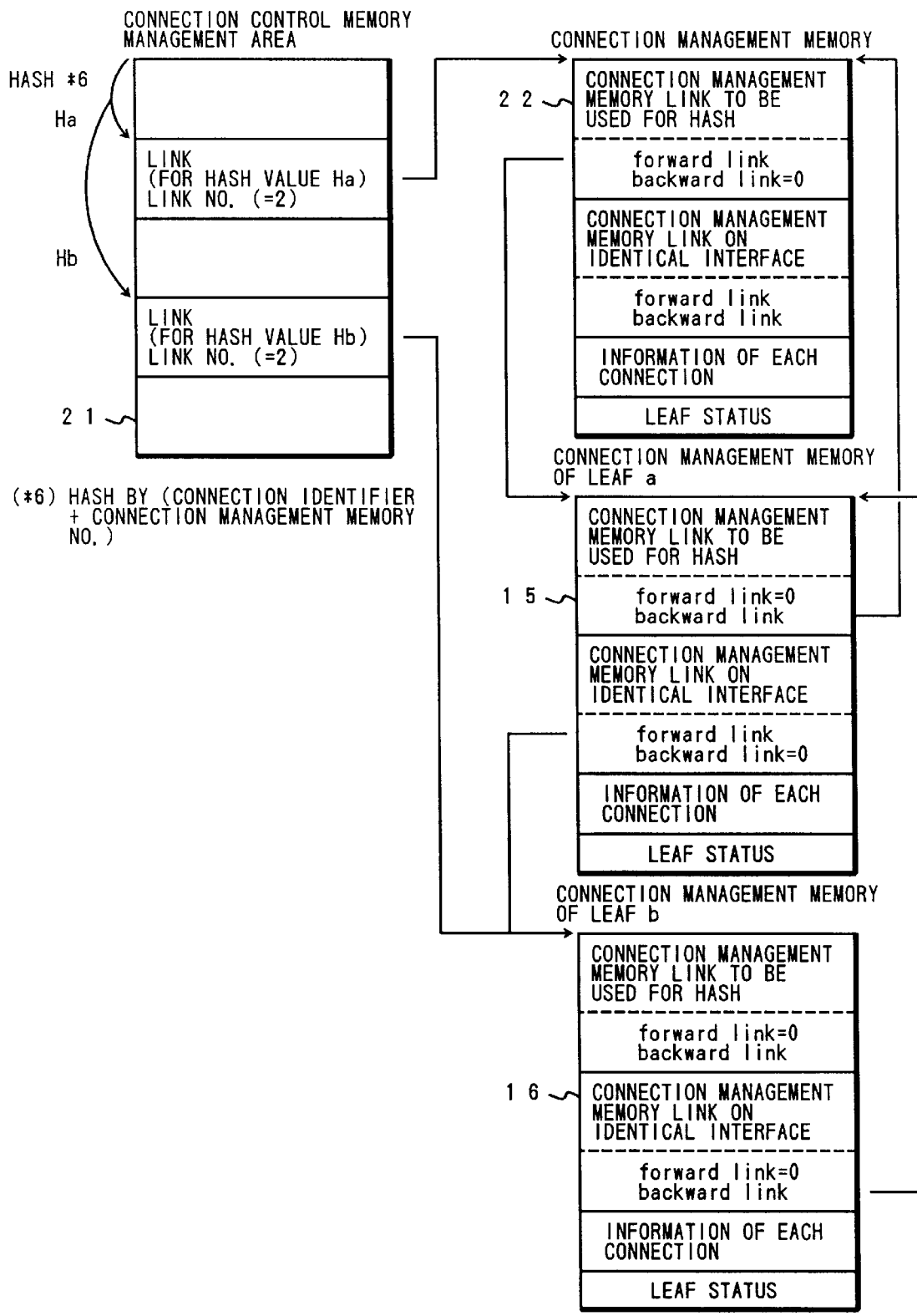
FIG. 3 is a schematic block diagram showing relations among a connection control memory management area 21, a connection management memory 22 and leaf connection management memories 15 and 15, as according to the system of FIG. 1.

FIGS. 1 to 3 schematically show a memory construction forming an essential portion of an embodiment of the switch system according to the present invention, and FIGS. 4 to 10 show a processing deciding procedure.

In order to facilitate the understanding, here will be omitted the procedure for switching messages between a user relating to the setting of a connection and a switchboard and between the switchboard and the user.

In the point-to-multipoint, the manner to decide a processing is determined, as shown in FIG. 20. In order to realize this, calls are controlled by the procedure, as shown in FIGS. 4 to 10, by using the data which are stored in memories shown in FIGS. 1 to 3.

Figure 11:
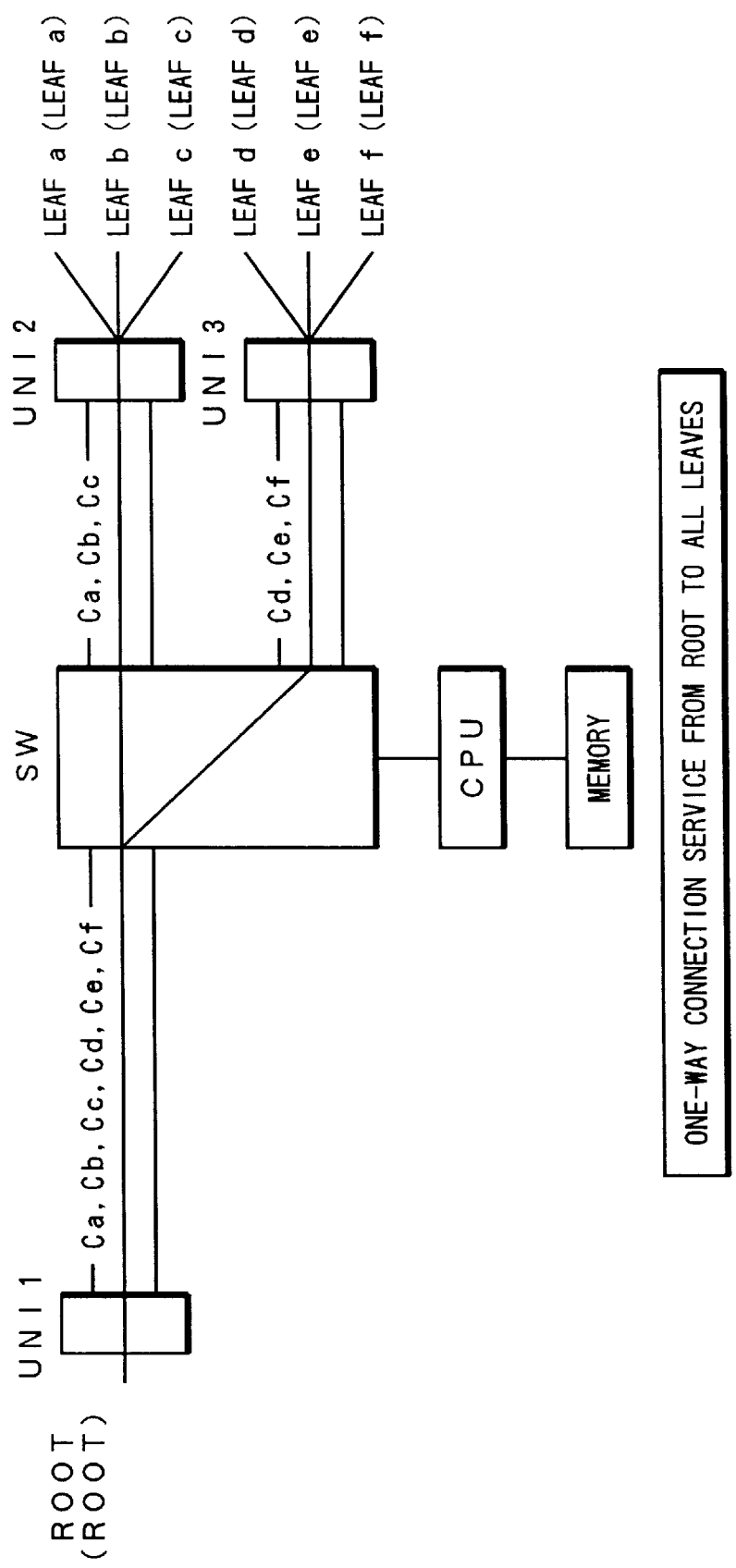
FIG. 11 is a block diagram showing a construction of a multi-connection in a switch system of the prior art.
Figure 12:
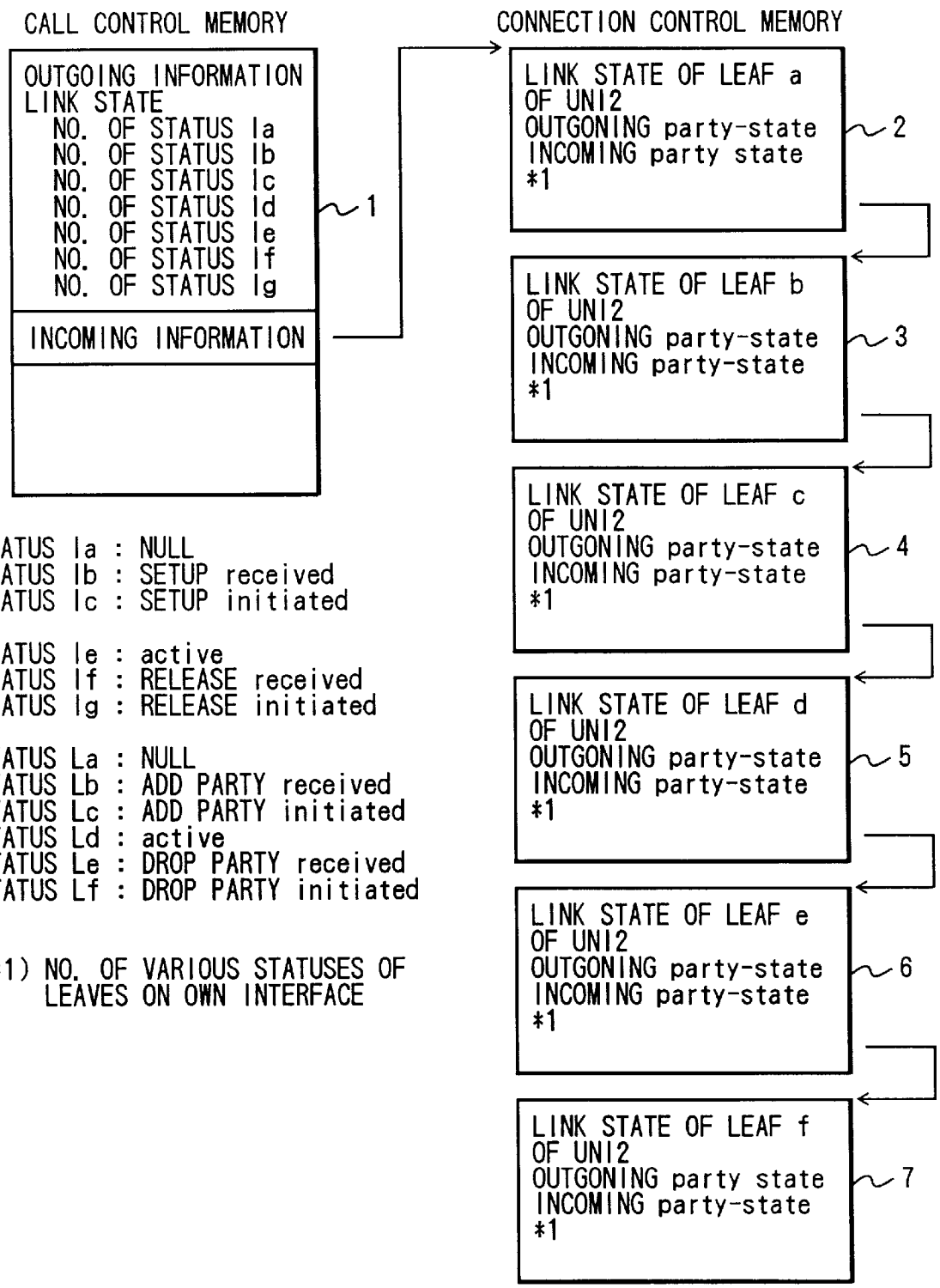
FIG. 12 is a schematic block diagram showing a memory construction in the switch system of the prior art.
Figure 13:
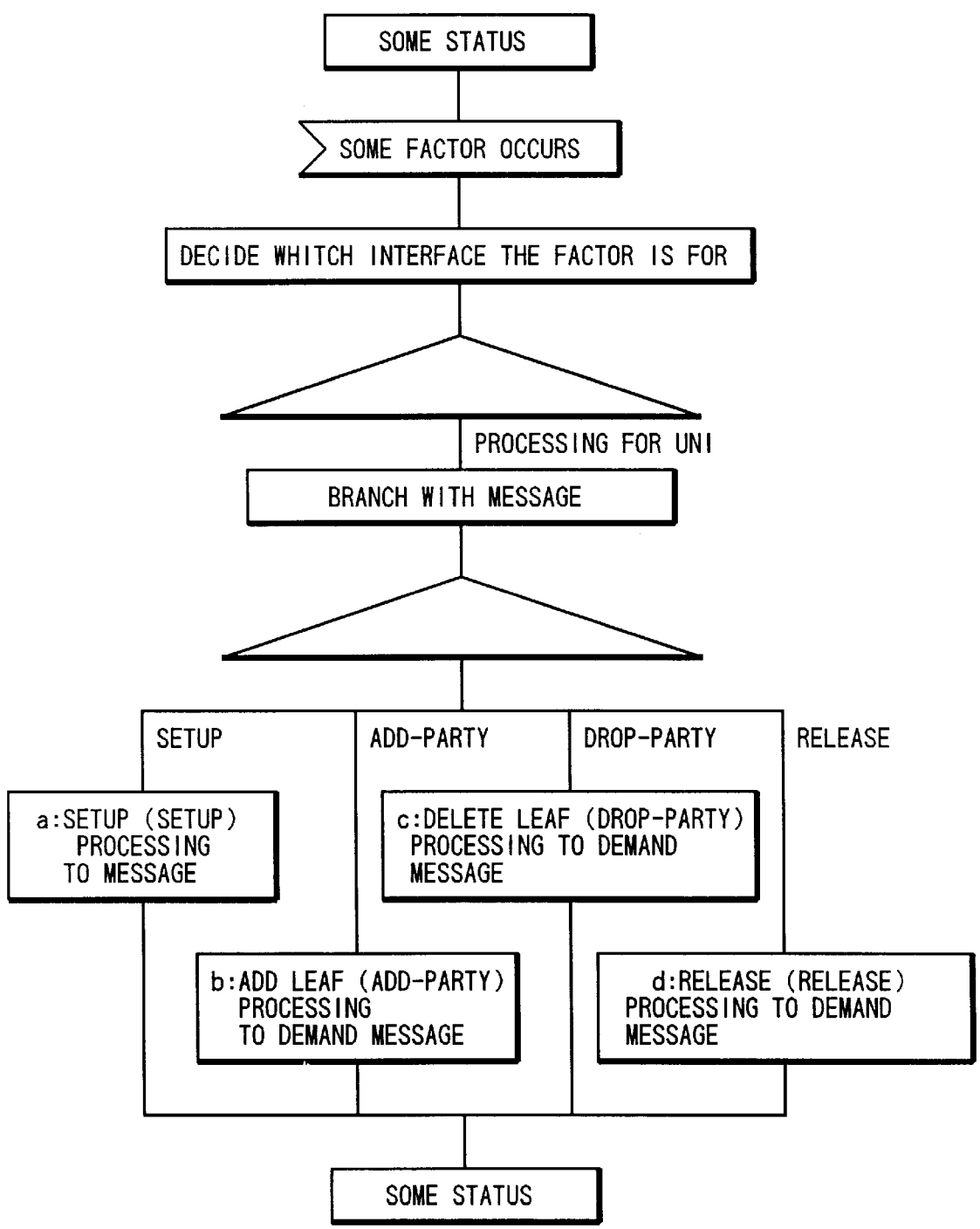
FIG. 13 is a flow chart showing a main routine of the processing decision logic of the prior art according to the system of FIG. 12.
Figure 14:
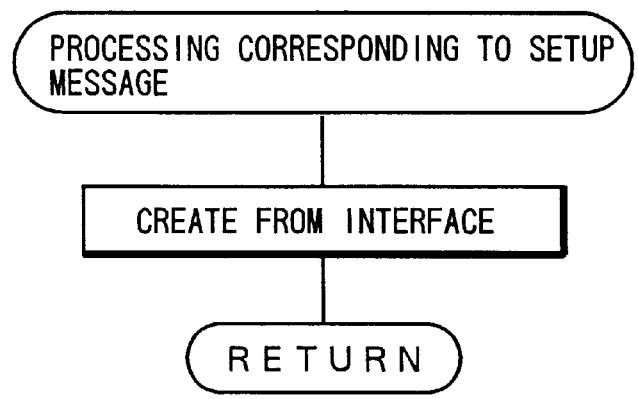
FIG. 14 is a flow chart showing a processing corresponding to a setup message of the processing decision logic according to the system of FIG. 12.
Figure 15:
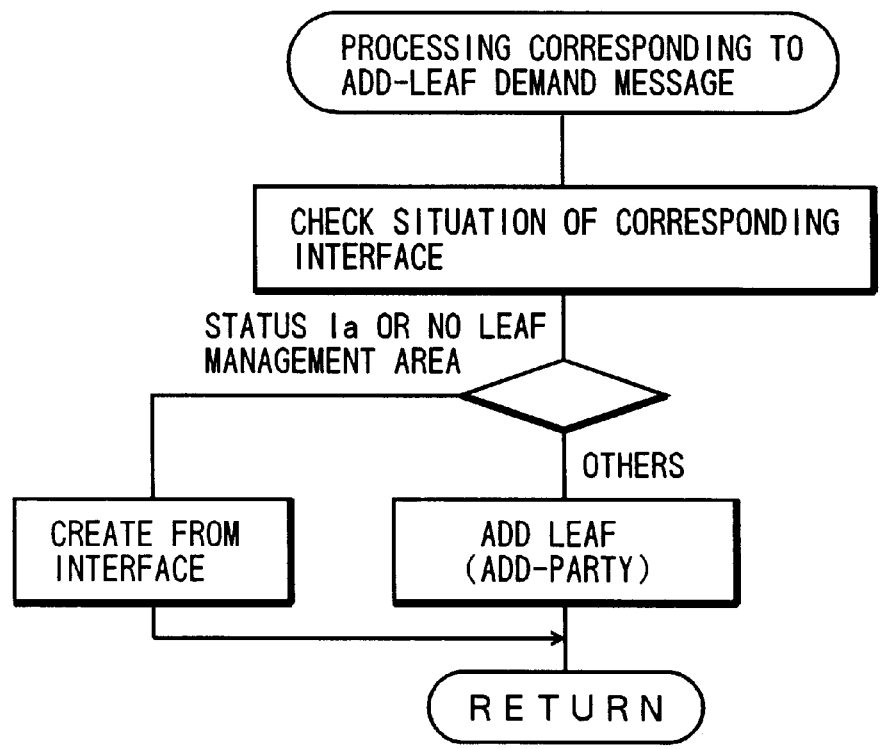
FIG. 15 is a flow chart showing a processing corresponding to an add-leaf demand message of the processing decision logic according to the system of FIG. 12.
Figure 16:
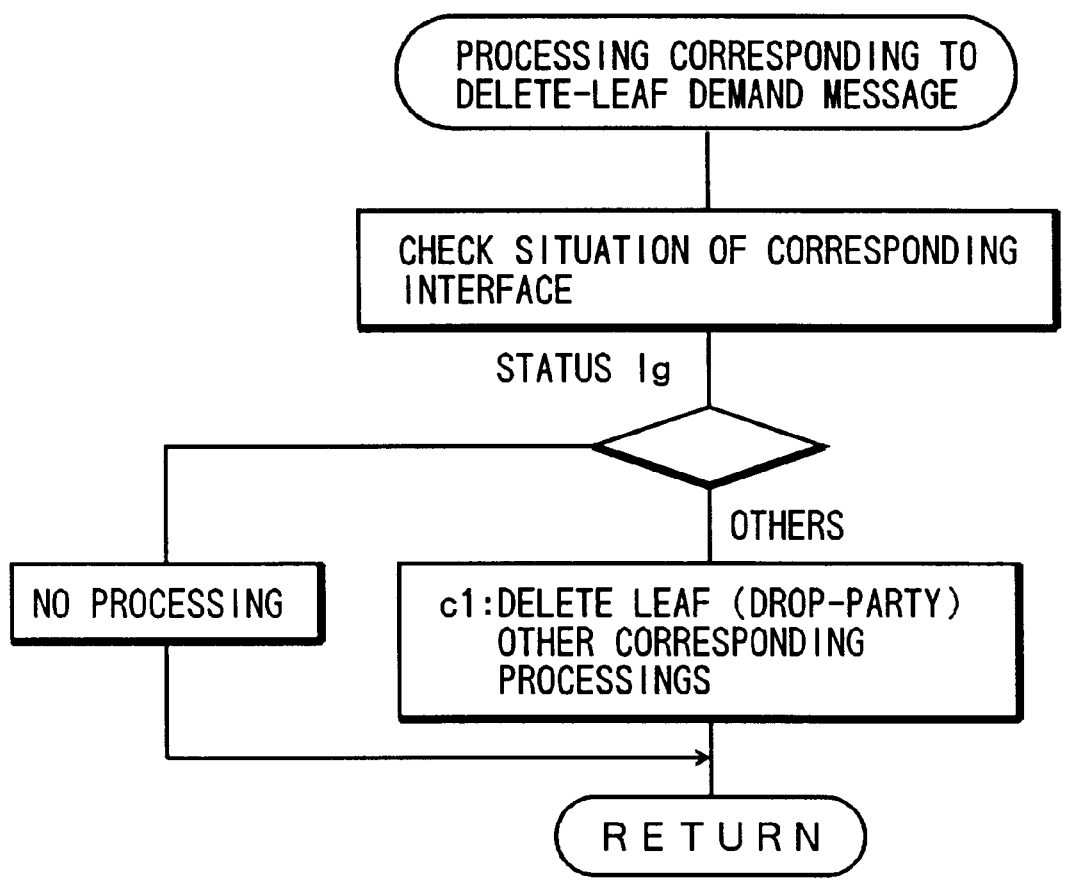
FIG. 16 is a flow chart showing a processing corresponding to a delete-leaf demand message of the processing decision logic according to the system of FIG. 12.
Figure 17:
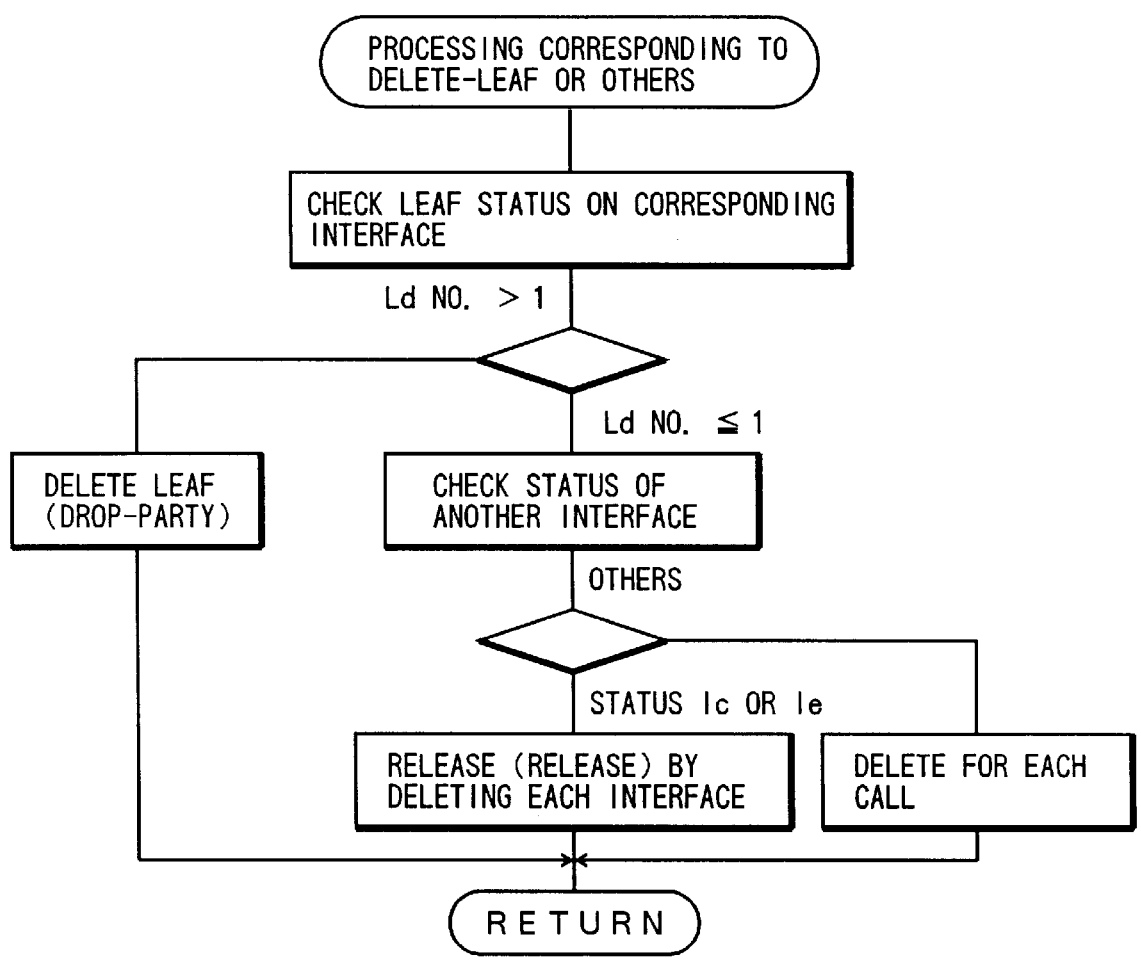
FIG. 17 is a flow chart showing a processing corresponding to a delete-leaf demand or others of the processing decision logic according to the system of FIG. 12.
Figure 18:
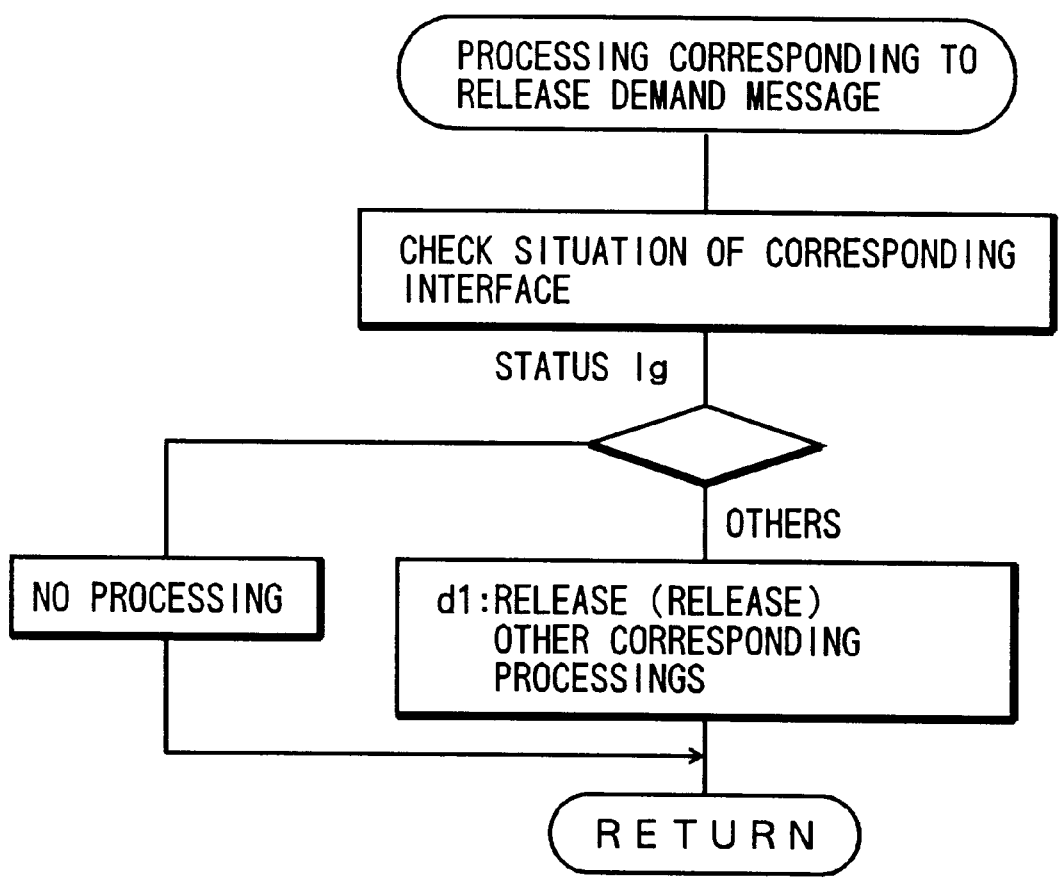
FIG. 18 is a flow chart showing a processing corresponding to a release demand message of the processing decision logic according to the system of FIG. 12.
Figure 19:
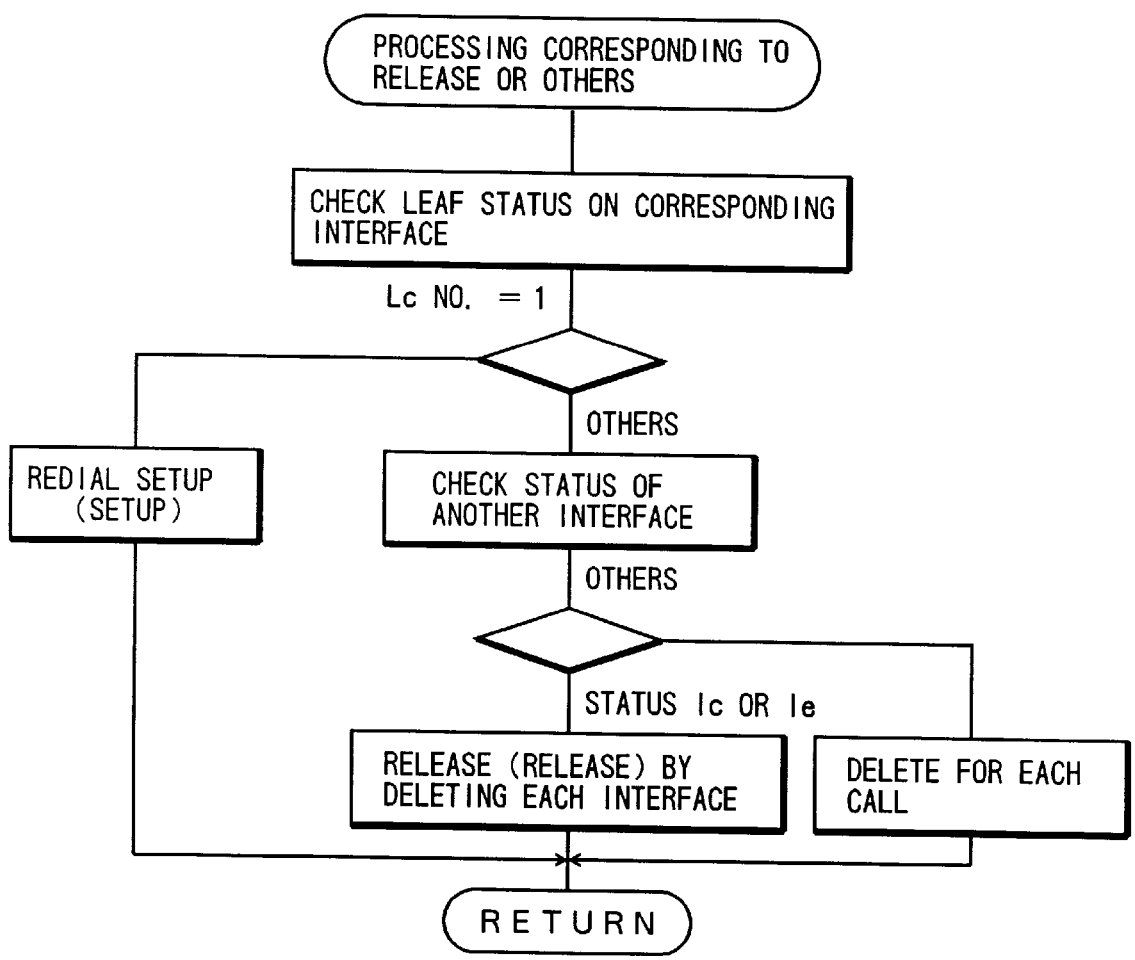
FIG. 19 is a flow chart showing a processing of a release demand or others of the processing decision logic according to the system of FIG. 12.

FIG. 11 shows an example of connection of a point-to-multipoint and a connection service from a dialer, i.e., a root ROOT, as accommodated in a user network interface UNI, to a leaf a (LEAF a), a leaf b (LEAF b) and a leaf c (LEAF c) of a user network interface UNI2, and a leaf d (LEAF d), a leaf e (LEAF e) and a leaf f (LEAF f) of a user network interface UNI3.

FIG. 1 shows relations among a call control memory 11, a whole leaf interface (LEAF interface) managing area 12 and leaf management areas 13 and 14 for each interface. An interface 2a is the interface of the user network interface UNI2, and an interface 3a is the interface of the user network interface UNI3.

The "LEAF INTERFACES" of FIG. 1 indicate the management points of the user network interface UNI2 and the user network interface UNI3 of FIG. 11. In FIG. 1, statuses La to Lf indicate the statuses on the connection management of the leaf a to the leaf f (LEAFa TO LEAFf) of FIG. 11, and statuses Ia to Ig indicate the statuses on each interface management.

The call control memory 11 is stored with the management information of the leaf interface, the numbers of the statuses Ia to Ig, the leaf interface information and the link information. The whole leaf interface managing area 12 is hashed with the user network interface UNI No.+the interface No. The whole leaf interface managing area 12 is stored with the link information of the leaf management area. The leaf management areas 13 and 14 of each interface are stored with the information of the corresponding interface and the link information. The leaf management areas 13 and 14 of each interface contain the areas for managing the individual leaf management areas of each interface when they are hashed to take equal values.

FIG. 2 shows relations between the leaf management area 13A of the interface 2a and the leaf management area 14A of the interface 3a, as exemplifying the individual detail constructions of the leaf management area 13 of the interface 2a and the leaf management area 14 of the interface 3a of FIG. 1, and leaf connection management memories 15 to 20. FIG. 2 shows portions of the leaf management area 13A of the interface 2a and the leaf management area 14A of the interface 3a.

The informations to be stored in the leaf management area 13A of the interface 2a and the leaf management area 14A of the interface 3a contain the link information to be used for the hashing, the link information for linking the leaf management areas of the whole interface relating to the point-to-multipoint, and the informations of the link statuses of the individual interfaces, the leaf numbers on each interface, and the numbers of the statuses Lb to Lf of the link. The leaf connection management memories 15 to 20 are stored with the link informations of the connection management memories belonging to an identical interface and the informations in the individual leaf statuses.

FIG. 3 shows relations among a connection control memory management area 21, a connection management memory 22 and the leaf connection management memories 15 and 16.

The connection control memory management area 21 is the management area of the connection control memories to manage the status of the connection, as contained in the message from the user, for easily searching the connection control memories from the connection identifier for identifying said connection and the numbers of the connection management memories.

The connection control memory management area 21 is hashed with the connection identifier+the connection management memory and is stored with the link information and the link number for identifying the individual connection management memories in case identical hash values are present.

The connection management memory 22 and the leaf connection management memories 15 and 16 are stored with the link information of the connection control memory link to be used for identifying the individual connection control memories, when identical hashes are present, the link information of the connection control memory line on identical interfaces, and the information and leaf status of each connection.

If all the statuses of the connections of FIG. 11 at an instant are active, for example, the status Ie in the management information of the leaf interface in the call control memory 11 of FIG. 1=2, and the number of the status Ld=3 in the interface 2a and also the number of the status Ld=3 in the interface 3a in the leaf management area of each interface, as shown in FIGS. 1 and 2.

Figure 4:
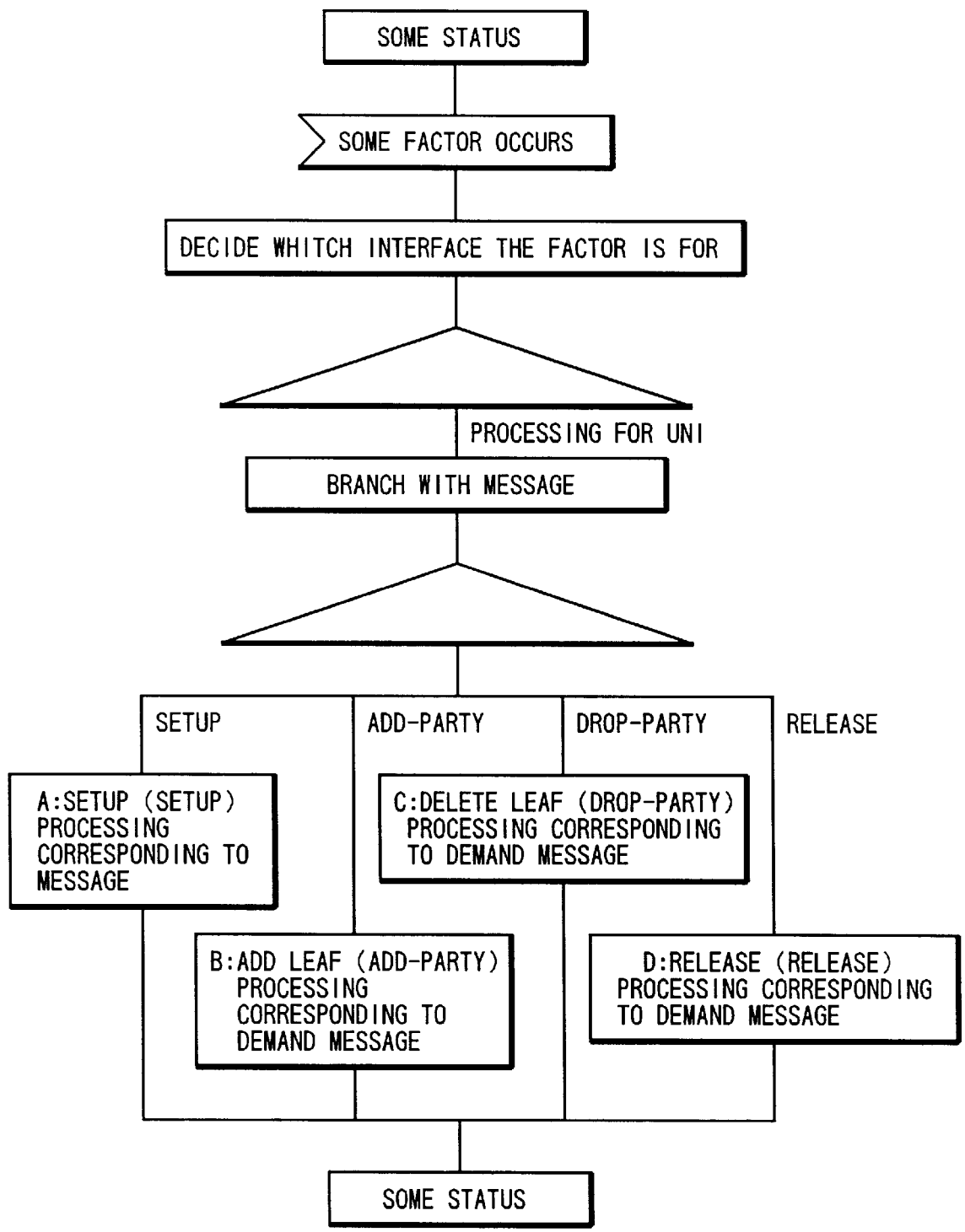
FIG. 4 is a flow chart showing a main routine of a processing decision logic according to the system of FIG. 1.
Figure 7:
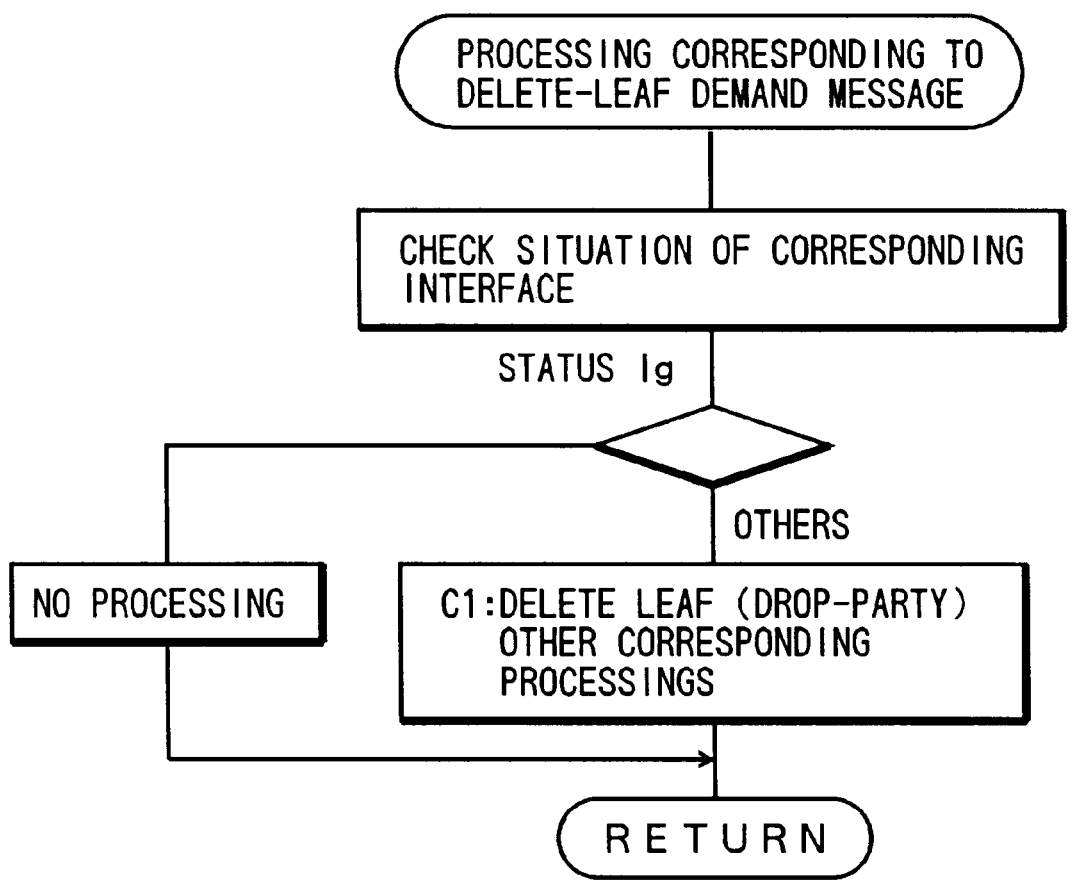
FIG. 7 is a flow chart showing a processing corresponding to a delete-leaf demand message of the processing decision logic according to the system of FIG. 1.

When, at this time, a demand (DROP-PARTY) to delete the leaf a (LEAFa) is given from the root, the call control memory 11 for controlling this call is determined at first (although a detailed description of this decision logic will be omitted). Next, a processing, i.e., the "DROP-PARTY PROCESSING", as corresponding to the DROP-PARTY message, is started by a branch processing with the message, as shown in FIG. 4. For the delete demand (DROP-PARTY), the "DROP-PARTY" is decided in the routines shown in FIGS. 7 and 8.

At this DROP-PARTY processing, the leaf a (LEAFa) connection management memory 15 of FIG. 3 is released, and the leaf a (LEAFa) connection management memory 15 is deleted from the interface 2a management area of FIG. 2, and the status Ld number is subtracted.

When the demand to delete the leaf b (LEAFb) is given, too, the processing is likewise determined to delete the leaf b (LEAFb).

When the demand to delete the leaf c (LEAFc) is given, the status Ie is active, but the status Ld number=1 so that the "DELETE BY EACH INTERFACE" is decided. The memory relating to the leaf c (LEAFc) is released as in the cases of the leaf a (LEAFa) and the leaf b (LEAFb). After this, the leaf management area 13 (13A) of the interface 2a of FIGS. 1 and 2 is released to subtract the status Ie number in the call control memory 11.

Figure 8:
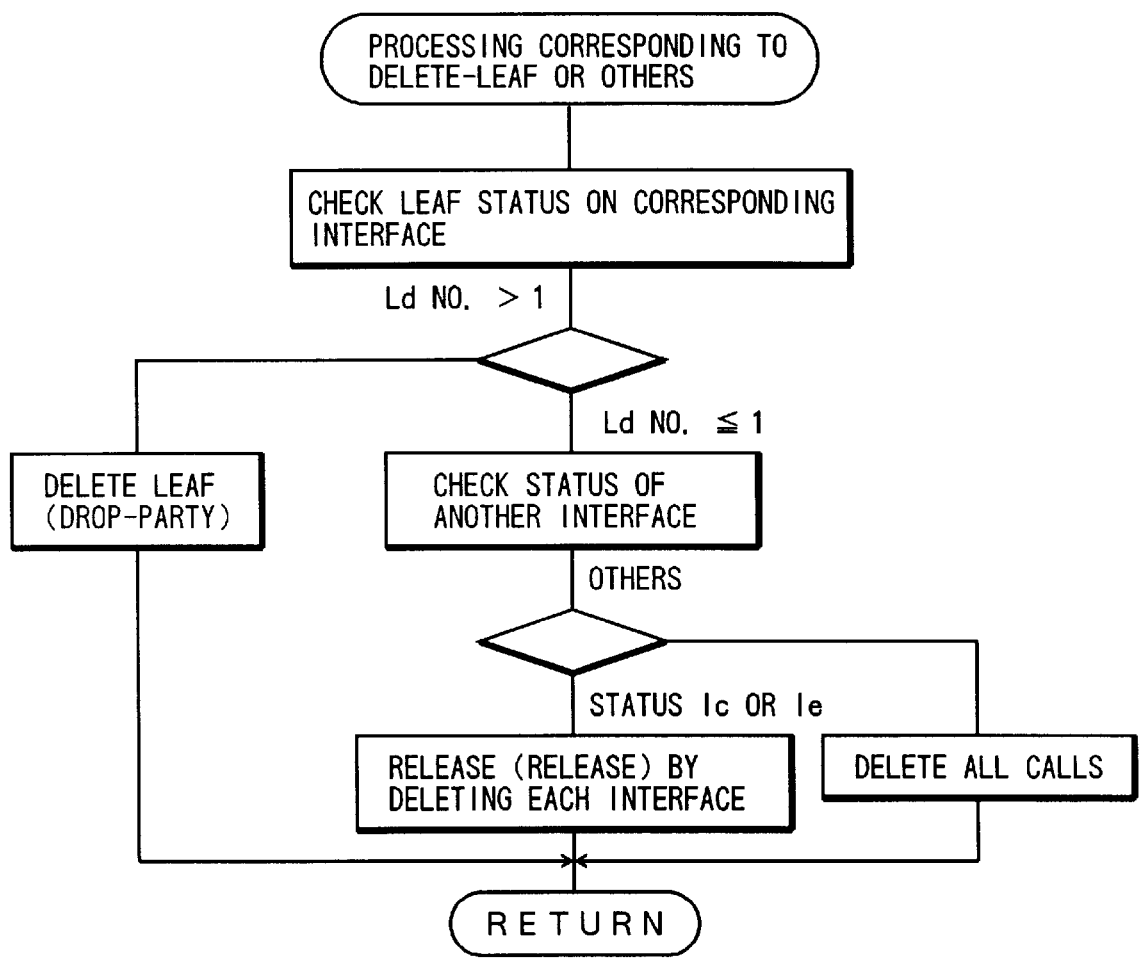
FIG. 8 is a flow chart showing a processing corresponding to a delete-leaf demand or others of the processing decision logic according to the system of FIG. 1.
Figure 9:
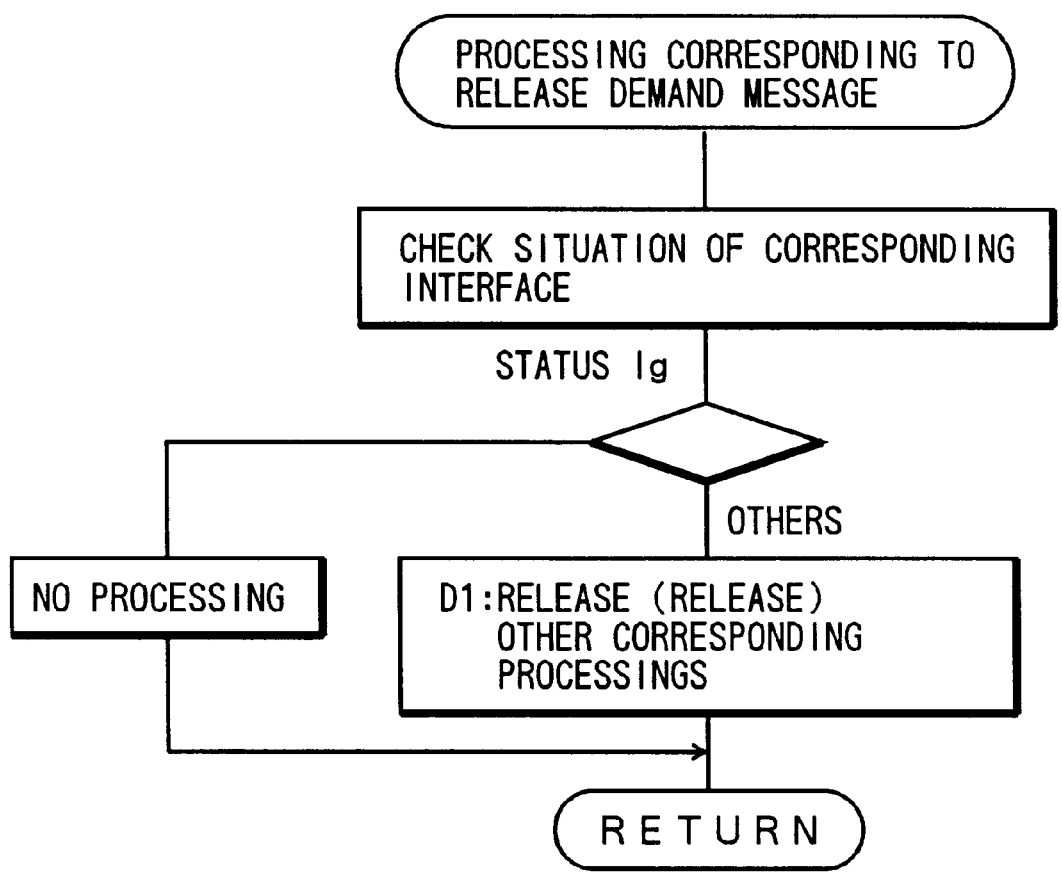
FIG. 9 is a flow chart showing a processing corresponding to a release demand message of the processing decision logic according to the system of FIG. 1.
Figure 10:
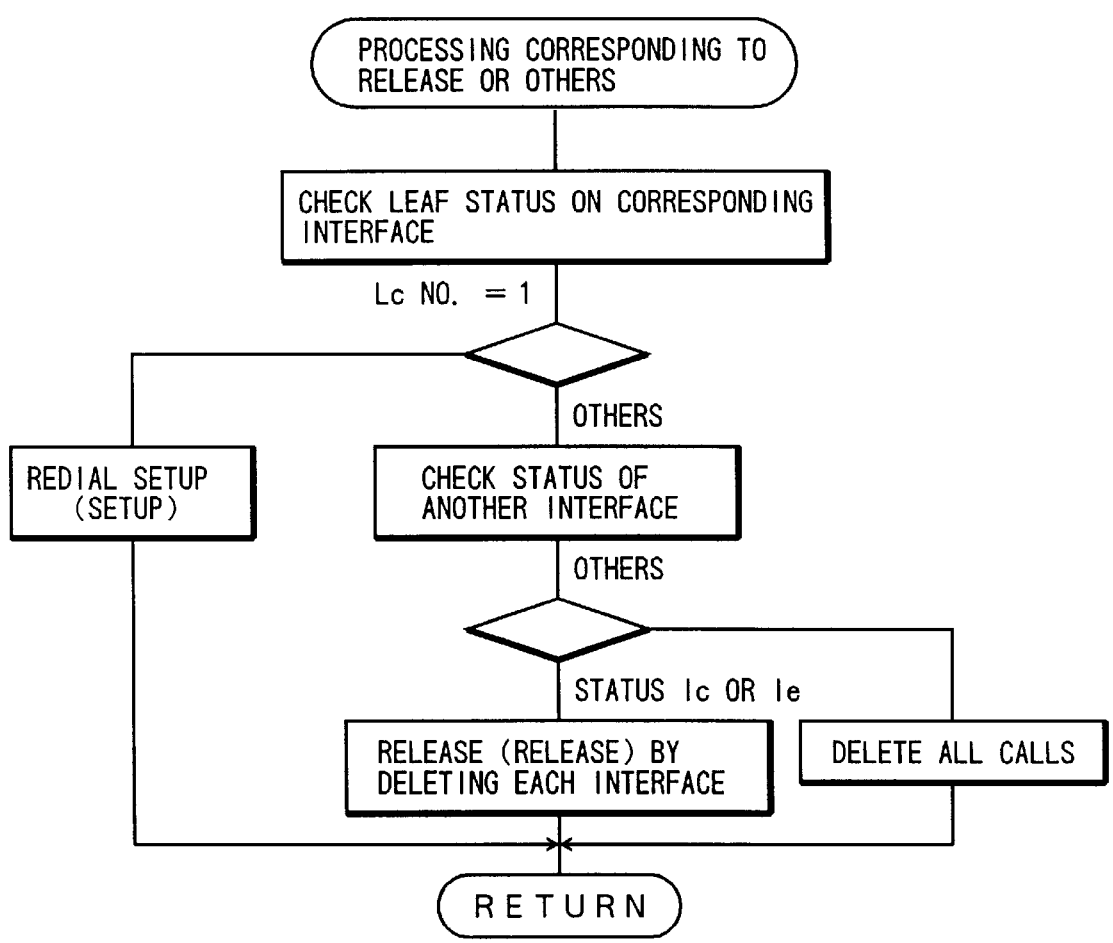
FIG. 10 is a flow chart showing a processing corresponding to a release demand or others of the processing decision logic according to the system of FIG. 1.

The leaf d (LEAFd) and leaf e (LEAFe) are also sequentially processed. When the demand to delete the leaf f (LEAF f) is finally given, the processing to "DELETE CALLS" is decided, as shown in FIG. 8, to delete all calls.

Here will be described the processing when the demand to add the leaf d (LEAFd) is fed to the user network interface UNI3 with no leaf being in the user network interface UNI3 of FIG. 11. If, at this time, the statuses of all leaves (LEAF) on the root ROOT and the user network interface UNI2 are active, the situations of the individual data are such that the status Ie number of FIG. 1=2, that the leaf management area of each interface of FIGS. 1 and 2 has only the interface 2a, and that the status Ld number of the interface 2a=3.

If, in this status, the leaf adding demand (ADD-PARTY) is fed to the user network interface UNI3, the routine is branched according to the message, as shown in FIG. 4, so that the processing for the ADD-PARTY message is started.

Since, at this time, no corresponding interface is present, the processing of "CREATE FROM INTERFACE" is decided by the routine of FIG. 6 to retain the area for the interface 3a and capture the connection control memory of the leaf d (LEAFd) thereby to create the interface 3a and the leaf d (LEAFd).

When the creations of the interface 3a and the leaf d (LEAFd) are completed, the aforementioned individual data are such that the status number Ie of the interface=3, that the Ld numbers on the interface 2a are identical, and that the Ld number on the interface 3a=1.

After this, when the demands to add the leaf e (LEAFe) and the leaf f (LEAFf) are given to the user network interface UNI3, the processing of "ADD-PARTY" is decided from FIG. 6, because the status of the corresponding interface is Ie, thereby to capture and set the connection control memory and to control the individual numbers of the statuses La to Lf on the leaf management area 14 of the interface 3a.

As to the statuses of the interfaces, as shown in FIGS. 5 to 10, the leaf management areas and the link statuses are determined on the basis of the data on the call control memory 11 of FIG. 1. The leaf statuses on the corresponding interface are determined from the data of the leaf management areas 13A and 14A of FIG. 2.

As shown in FIGS. 4 to 10, the processings of adding/deleting the leaves, adding/deleting the interfaces and deleting the calls can be easily decided, and the connections can be linearly controlled to the limit of the system.

As has been described hereinbefore, according to the present invention, it is possible to provide a multi-connection management method and apparatus for a switch system, in which upon the management of a multi-connection in the switch system, a management area is prepared for each interface of the multi-connection to manage a call by the management area so that a processing for a given demand can be promptly decided to make the connection management highly efficient.

If the statuses are held for individual connections and managed, and if a management area is prepared for managing the various statuses of the connections at the unit of the interface and the number of connections in the individual statuses so that the connections may be managed at the two points of the statuses of the individual connections and the number of the statuses of the connections of the individual interfaces, the statuses of all the connections can be easily grasped for the individual interfaces.

If, moreover, a management area as dedicated to the management of the status number of the interfaces while giving the statuses to the individual interfaces so that the interface of the multi-connection may be managed by managing the number of interfaces of the aforementioned individual statuses, the statuses of all the interfaces can be easily grasped at the unit of call.

If, moreover, one call control memory is prepared for controlling a plurality of connection management memories and calls for managing the individual connections containing the statuses of the multi-connections so that the connection management memories may be commonly managed by the whole system and by the call control memories, the connection control memories can be managed by the whole system to easily retrieve the individual connection control memories.

If, still moreover, a connection status control memory for managing the statuses of the multi-connections, a connection control memory for managing the information of the connection other than the status number by linking to the connection status control memory, and one call control memory for controlling calls are prepared so that the connection status control memories may be commonly managed by the whole system and by the call control memory, the connection status control memories can be managed by the whole system and can be easily retrieved.

If, furthermore, a management area for managing each interface of the multi-connections and one call control memory for controlling calls are prepared so that the management area may be commonly managed by the whole system and by the call control memory, the management area of each interface of the multi-connections can be managed by the whole system and can be easily retrieved.

In the multi-connection management method and apparatus in the switch system according to the present invention, therefore, the processing to be executed can be easily decided at the unit of all or at the unit of interface when some event occurs in the multi-connections. Since the retrieving method is simplified by making the various management areas common, moreover, it is possible to easily increase/decrease the interface number of each call, manage the statuses of the interfaces, increase/decrease the number of leaves (LEAF) on each interface and extract the connection control memories and to use the individual management areas effectively.

Preferred embodiments 2 and so on of the multicast connection status confirmation system according to the present invention will be described with reference to the accompanying drawings.

Embodiment 2

FIG. 21 shows a construction of a first embodiment of a switch system in which is incorporated a multicast connection status confirmation system according to the present invention.

The switch system of FIG. 21 includes a switch board 10 and terminals 21 and 31, 32, . . . , and 3n.

The terminal 21 makes a contract of a multicast PVC with the terminals 31 to 3n and registers it in the system. In this case, the terminal 21 is an outgoing terminal whereas the terminals 31 to 3n are incoming terminals.

The switchboard 10 includes a communication controller 41, a multicast server 51, and line accommodators 61, 62, . . . , and 6N and 71, 72, . . . , and 7n. The switchboard 10 corresponds to the frame relay network itself in the case of the frame relay system, as will be described when it is applied to the user-to-network interface (as will be shortly referred to as "UNI") of the frame relay network. In this case, the UNI may be either synchronous or asynchronous.

The line accommodators 61 to 6N are accommodators for accommodating the lines to be connected with the subscriber's terminals at the input side, i.e., at the outgoing side. In this case, however, only the terminal 21 is considered as the subscriber's terminal at the outgoing side. In FIG. 21, therefore, only the line accommodator 62 is shown, as connected with the terminals 21.

The line accommodators 71 to 7n are line accommodators for accommodating the lines to be connected with the subscriber's terminals at the output side, i.e., at the incoming side. In this case, the terminals 31 to 3n are considered as the subscriber's terminals at the incoming side. In FIG. 21, therefore, the line accommodators 71 to 7n are shown, as connected with the terminals 31 to 3n.

The multicast server 51 is stored with multicast conditions according to the registered content of the multicast PVC between the terminal 21 and the terminals 31 to 3n. The multicast server 51 transfers the data, as received from the terminal 21 through the line accommodator 62, to the communication controller 41 and-transfers the data, as sent out from the communication controller 41, to the terminal 21 through the line accommodator 62.

For the normal data communications, moreover, the multicast server 51 broadcasts the identical data, as fed from the communication controller 41, through the line accommodators 71 to 7n to the terminals 31 to 3n according to the aforementioned multicast conditions. For confirming the PVC status, the multicast server 51 selects a target incoming terminal in accordance with the stored multicast condition and confirms the statuses of the line accommodators 71 to 7n accommodating the corresponding terminals 31 to 3n. Then, the multicast server 51 collects the statuses of the individual line accommodators 71 to 7n and returns the collected information to the communication controller 41.

In the normal data communications, the communication controller 41 subjects the case, as sent from the terminal 21 and transferred from the multicast server 51, to protocols necessary for the data communications, and transfers them as the data, as to be sent to the terminals 31 to 3n, to the multicast server 51.

For confirming the PVC status, on the other hand, the communication controller 41 subjects the PVC status enquiry message (as will be shortly referred to as the "SE MESSAGE"), as sent from the terminal 21 and received thereby, to a message decision upon whether or not the SE message is effective for the protocols. Then, the communication controller 41 demands the multicast server 51 for the information collection if it decides that the SE message is effective. When the response information of the statuses of the individual line accommodators 71 to 7n, as collected by the multicast server 51, are resultantly returned from the multicast server 51 to the communication controller 41, this communication controller 41 edits the PVC status message (as will be shortly referred to as the "S MESSAGE") or the connection status notice message on the basis of that response information and sends out it to the multicast server 51 to return it to the terminal 21 through the line accommodator 62.

The S MESSAGE in the communication controller 41 has a variety of editions. In the case of this embodiment, the communication controller 41 edits the S MESSAGE in the form, in which the status informations of the terminals 31 to 3n, as obtained from the line accommodators 71 to 7n through the multicast server 51, are enumerated.

The switch system, as shown in FIG. 21, will be described in more detail with reference to FIGS. 23 to 26.

First of all, the sequence of the case of the normal data communications on the UNI will be described in the following.

(1) The terminal 21 makes a contract of the multicast PVC with the terminals 31 to 3n. This contract is registered in the system. In this case, the multicast condition, as based upon the contract content, is stored in the multicast server 51 of the switchboard 10 or the frame relay network.

(2) When the terminal 21 sends the data, the corresponding line accommodator 62 in the switchboard 10 receives the data and transfers them to the communication controller 41 through the multicast server 51. At this time, what is done by the multicast server 51 is not any special processing but to transfer the data.

(3) The communication controller 41 subjects the received data to the protocols necessary for the ordinary data communications and transfers the resultant data to the multicast server 51 at the output side.

(4) The multicast server 51 broadcasts the identical data to the corresponding terminals 31 to 3n in accordance with its stored multicast condition.

Figure 23:
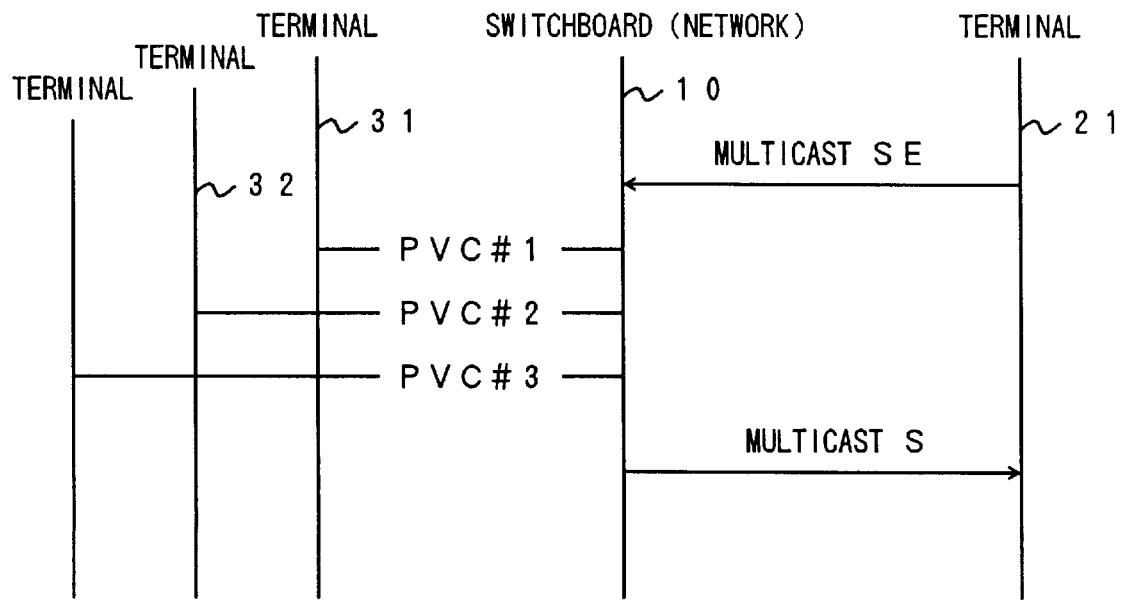
FIG. 23 is a diagram for explaining a multicast status confirmation sequence of the UNI according to the system of FIG. 21.

Here will be described the multicast PVC status confirmation sequence on the UNI. FIG. 23 schematically shows the multicast PVC status confirmation sequence on the UNI.

(1) When the terminal 21 transmits the multicast PVC status confirmation demand message, i.e., the multicast SE MESSAGE, the corresponding line accommodator 62 in the switchboard 10 receives the SE MESSAGE and transfers the SE MESSAGE data to the communication controller 41 through the multicast server 51. At this time, what is done by the multicast server 51 is not any special processing of the received data but to transfer the SE MESSAGE to the communication controller 41.

(2) The communication controller 41 decides whether or not the received message is effective for the protocols. The communication controller 41 demands the multicast server 51 to collect the information if it decides that the received message is an effective SE MESSAGE.

(3) Under the stored multicast condition, the multicast server 51 selects the target incoming terminals of the multicast PVC, i.e., the terminals 31 to 3n and confirms the statuses of the line accommodators 71 to 7n for accommodating the subscriber's terminal lines of the corresponding terminals 31 to 3n.

(4) When the multicast server 51 confirms the statuses of the individual line accommodators 71 to 7n and collects the informations, it enumerates the collected informations and returns them to the communication controller 41.

(5) The communication controller 41 edits the multicast PVC status notice message, i.e., the multicast S MESSAGE on the basis of the response informations, as returned from the multicast server 51, and returns it to the terminal 21 through the multicast server 51 and the line accommodator 62.

Figure 24:
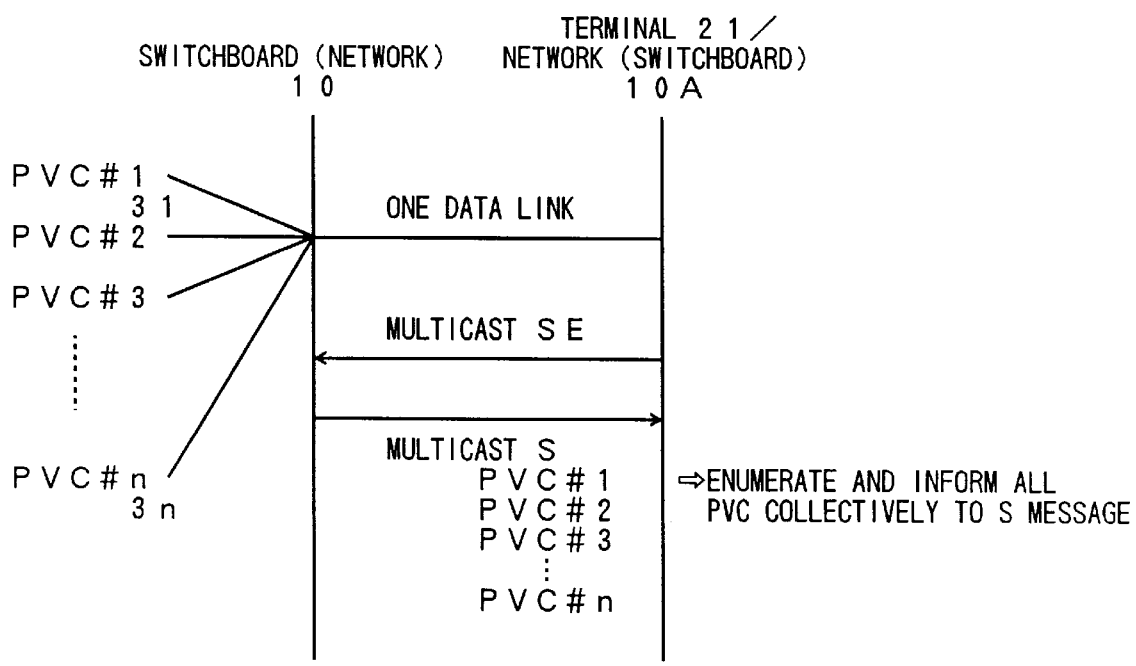
FIG. 24 is a diagram for explaining a multicast status confirmation system according to the system of FIG. 21.

In this case, the multicast S MESSAGE is edited to contain the status informations, in which the statuses of the set individual PVC#1, PVC#2, . . . , and PVC#n of the multicast PVC are enumerated for one data link from the terminal to the switchboard 10, as conceptionally shown in FIG. 24.

Figure 25:
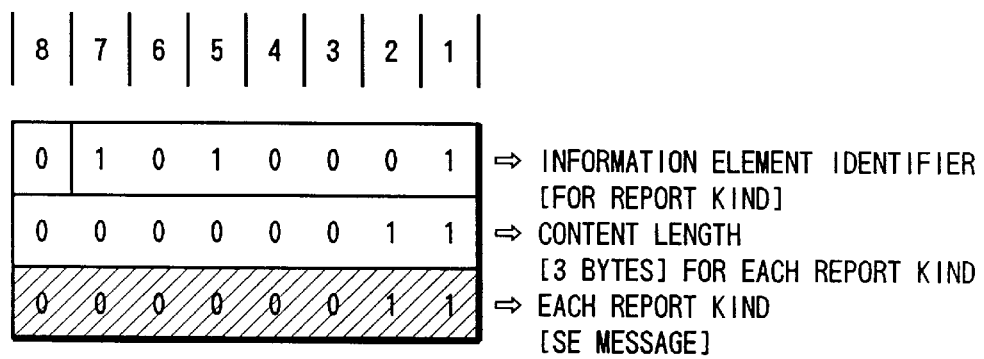
FIG. 25 is a diagram for explaining an example of a format of an SE message of a multicast PVC in a frame relay system.
Figure 26:
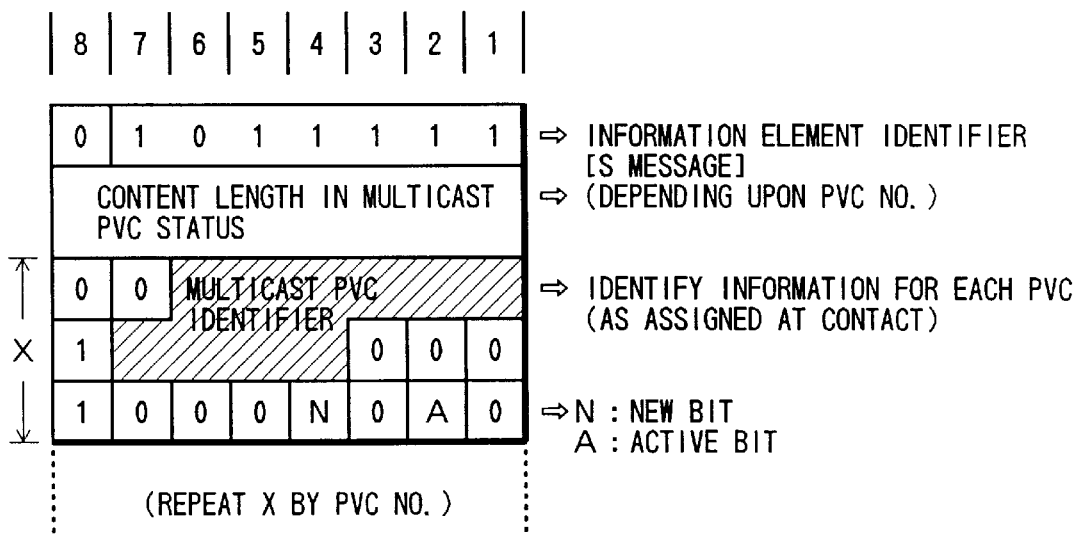
FIG. 26 is a diagram for explaining an example of a format of an S message of the multicast PVC in the frame relay system.

Examples of the specific formats of the SE MESSAGE and the S MESSAGE to be used in the aforementioned frame relay system are shown in FIGS. 25 and 26.

FIGS. 25 and 26 respectively show the SE MESSAGE and the S MESSAGE for confirming the multicast PVC status, as correspond to the formats disclosed in the attached material A of JT-Q. 933 of the TTC (Telecommunication Technology Committee) according to Annex A of Q. 933 recommended by CCITT (International Telegraph and Telephone Consultative Committee) or the standard specifications of the frame relay system, i.e., the ITU-T (International Telecommunication Union—Telecommunication Sector).

FIG. 25 shows a format for defining the information on each report kind, as indicating the SE MESSAGE. In this case, the first byte (or first octet) has a bit number 8 at "0" and bit numbers 7 to 1 as information element identifiers, as indicated by "1010001" or the information for each report kind. The second byte indicates the information element length, i.e., the content length for each report kind, as indicated by "000000011" because it is composed of 3 bytes (or 3 octets) as a whole. Moreover, the third byte is the information indicating the report kind and is indicated by "00000011", for example, as not defined in the aforementioned standards, so as to indicate the status confirmation (or demand) of the multicast PVC.

FIG. 26 shows a format for defining the information relating to the information element identification, as indicating the S MESSAGE, and the status confirmation information of the multicast PVC status. In this case, the first byte (or first octet) has a bit number 8 at "0" and bit numbers 7 to 1 as information element identifiers, as indicated by "1011111" or the information in the multicast PVC status. The second byte indicates the information element length, i.e., the content length of the multicast PVC status and is dependent upon the PVC number of the multicast. Moreover, the third or later byte is the information indicating the multicast PVC status. In this case, the third or later byte is composed of 3 bytes (or 3 octets) for one PVC and has (3×the number of PVC) bytes.

Of these three bytes: the bit number 8 of the first byte is set at "0", as indicating the address extension octet; the bit number 8 of the second byte is set at "1", as indicating the address extension octet; and the bit number 8 of the third byte is set at "1", as indicating the address extension octet. Moreover, the bit numbers 6 to 1 of the first byte are set at more significant six bits of the data link connection identifier, as indicating the multicast PVC identifier, and the bit numbers 7 to 4 of the second byte are set at four bits subsequent to more significant six bits (i.e., the bit numbers 6 to 1) of the first byte of the data link connection identifier, as indicating the multicast PVC identifier. The bit number 4 of the third byte is set at NEW BIT N, as indicating whether or not it is new, and the bit number 2 is set at ACTIVE BIT A, as indicating whether or not it is active. The NEW BIT N implies that it is already given, if at "0", but that it is new, if at "1". The ACTIVE BIT A implies that it is inactive, if at "0", but that it is active, if at "1".

The remainders (i.e., the bit number 7 of the first byte, the bit numbers 3 to 1 of the second byte, and the bit numbers 7 to 5, the bit number 3 and the bit number 1 of the third byte) are all the preparatory bits and set to "0" in this case.

As described above, the bit number 6 of the first byte to the bit number 4 of the second byte (i.e., the bit numbers 6 to 1 of the first byte and the bit numbers 7 to 4 of the second byte) are the identification numbers which are given in advance to each multicast PVC. These identification numbers are assigned at the contract of the multicast PVC between the terminals and the network or between the networks.

Thus, in the case of the fixed connection communications of the multicast in the network services of the UNI by the frame relay, the connection state such as a breakage of the call-out link connection of the multicast can be confirmed by defining and transferring the connection state notice message, as editing the status information of the call-out link connection under the multicast.

Especially in this case, the aforementioned S MESSAGE is exemplified by the connection status notice message in which all the status informations of the call-out link connection under the multicast are enumerated, so that the individual statuses of the call-out link connections under the multicast can be specifically grasped.

Embodiment 3

Figure 27:
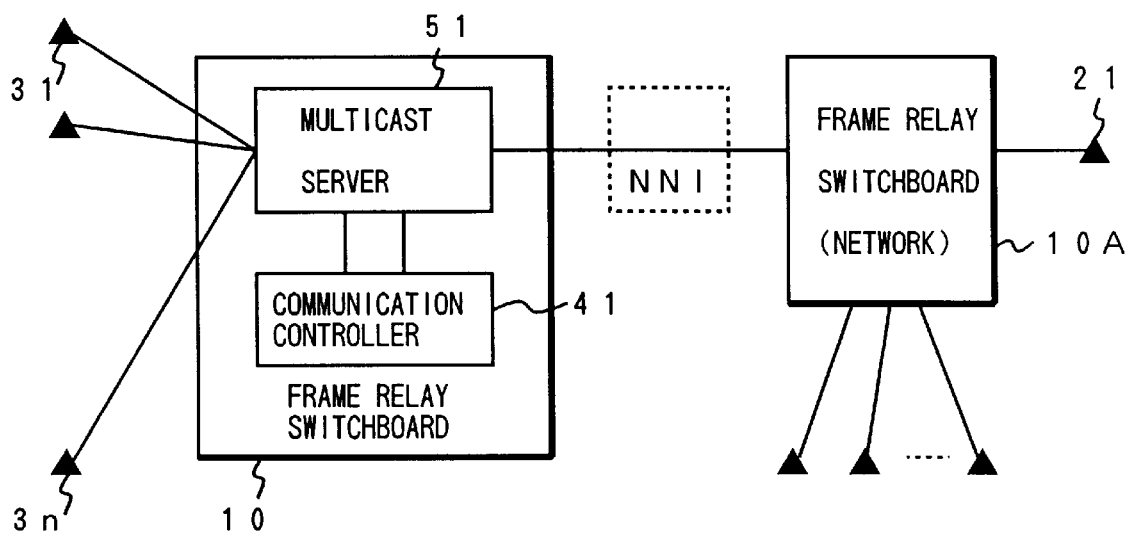
FIG. 27 is a system block diagram for explaining a status confirmation of a frame relay NNI of a switch system according to a second embodiment of the present invention for confirming the multicast connection.

The second embodiment of the switch system, in which is incorporated the multicast connection status confirmation system according to the present invention, is an embodiment corresponding to the case in which a switchboard 10 corresponding to the frame relay network is applied in the switch system having a construction similar to that of FIG. 21 to a network-to-network interface (as will be shortly referred to as the "NNI") of the frame relay network, as shown in FIG. 27. In this case, too, the NNI may be synchronous or asynchronous.

In this case, too, the switch system is substantially similar to that shown in FIG. 21, but a more detailed description will be made upon the portions which are different from those of the description of FIGS. 21 to 26.

Figure 22:
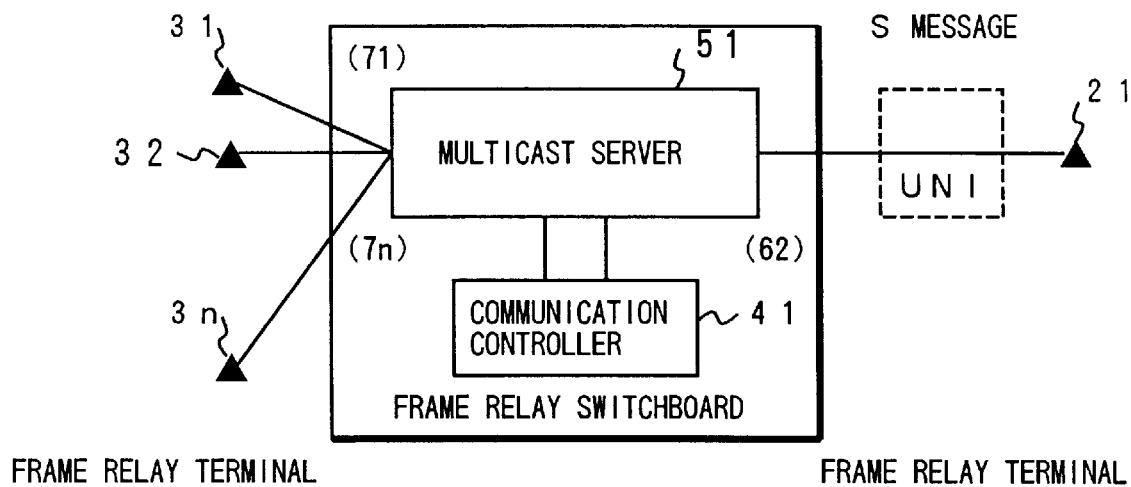
FIG. 22 is a system block diagram for explaining confirmation of the status of a frame relay UNI according to the system of FIG. 21.

First of all, for the normal data communications on the NNI, there is interposed between the terminal 21 and the switchboard (or network) 10 another switchboard (or network) 10A which transfers the informations similar to those of the aforementioned terminal 21 of FIGS. 21 and 22.

Figure 28:
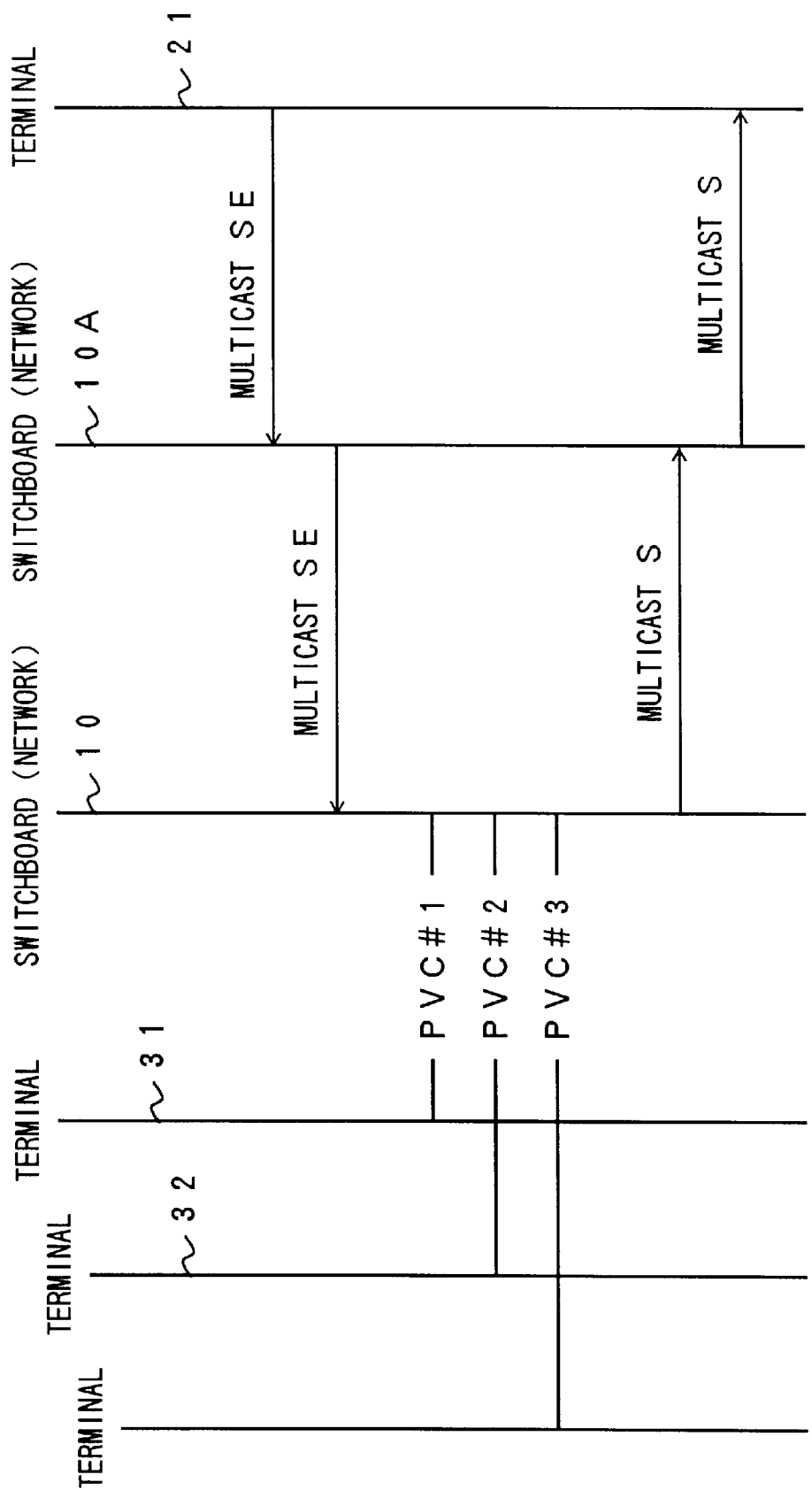
FIG. 28 is a diagram for explaining a multicast status confirmation sequence of the NNI according to the system of FIG. 27.

The multicast PVC status confirmation sequence on the NNI is schematically shown in FIG. 28.

(1) When the terminal 21 transmits the multicast PVC status confirmation demand message, i.e., the multicast SE MESSAGE through the switchboard 10A, it transfers the SE MESSAGE data to the communication controller 41 through the multicast server 51 in the switchboard 10. At this time, what is done by the multicast server 51 is not to process the received data but to transfer the SE MESSAGE to the communication controller 41.

(2) The communication controller 41 decides whether or not the received message is effective for the protocol regulations. The communication controller 41 demands the multicast server 51 for collecting the information if it is decided that the received message is an effective SE MESSAGE.

(3) The multicast server 51 selects the incoming terminals for the multicast PVC, i.e., the terminals 31 to 3n on the basis of the stored multicast condition and confirms the statuses for the subscriber's terminal lines of the corresponding terminals 31 to 3n.

(4) The multicast server 51, which has collected the information by confirming the status of each subscriber's terminal line, collects and returns the collected informations to the communication controller 41.

(5) The communication controller 41 edits the multicast PVC status notice message, i.e., the multicast S MESSAGE on the basis of the response information, as returned from the multicast server 51, and returns it to the terminal 21 through the multicast server 51 and the switchboard 10A.

In this case, the multicast S MESSAGE is edited to contain the status information, in which the statuses of the individual PVC#1, PVC#2, . . . , and PVC#n of the set multicast PVC are enumerated for one data link from the terminals to the switchboard 10, as conceptionally shown in FIG. 24.

Formats similar to those of the embodiment shown in FIGS. 25 and 26 can be used for the NNI as the SE MESSAGE and the S MESSAGE in the aforementioned frame relay system.

Embodiment 4

Figure 29:
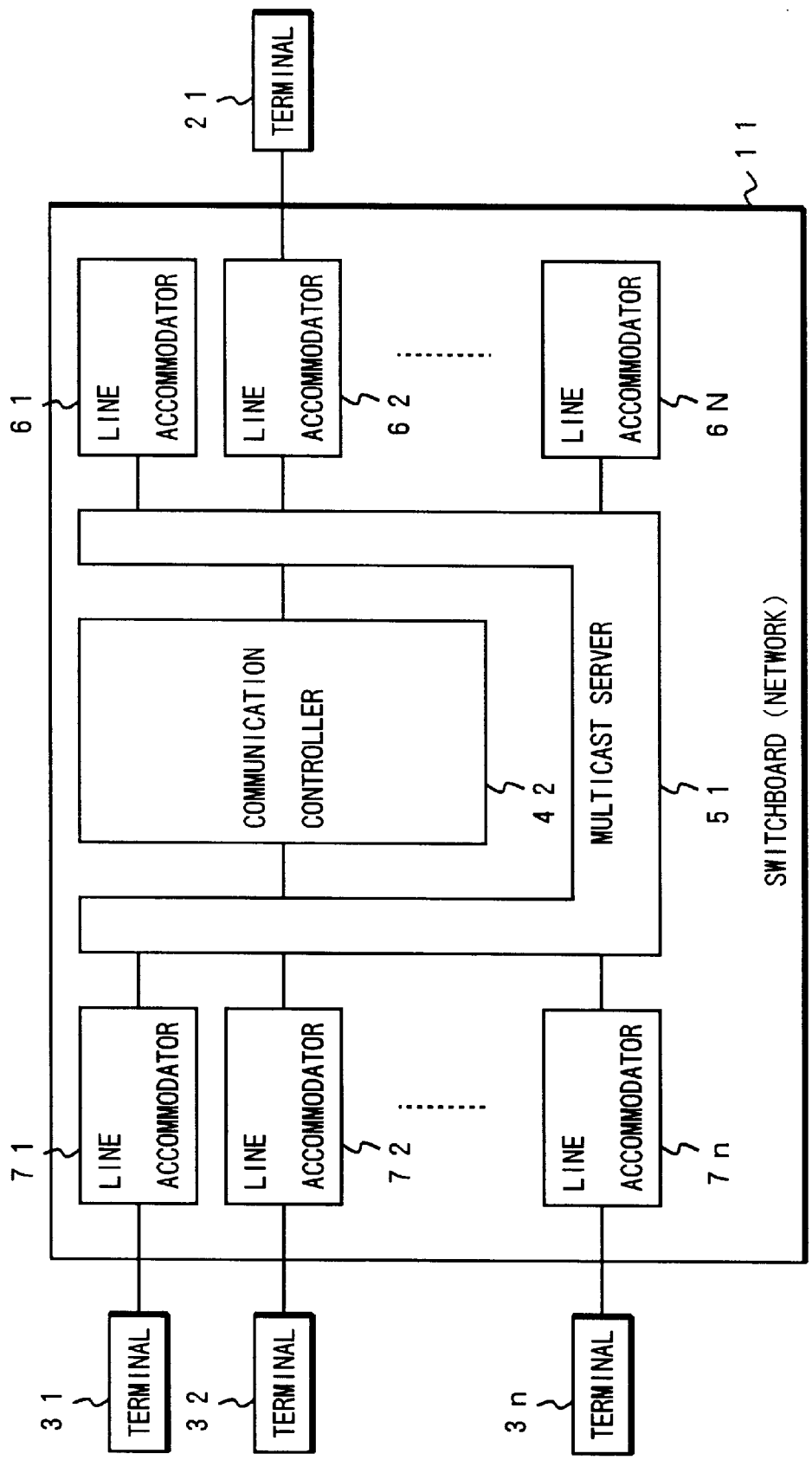
FIG. 29 is a block diagram showing a construction of a switch system according to a third embodiment of the present invention for confirming the multicast connection.

FIG. 29 shows a construction of a third embodiment of a switch system in which is incorporated the multicast connection status confirmation system according to the present invention.

The switch system of FIG. 29 includes terminals 21, and 31, 32, . . . , and 3n similar to those of the system of FIG. 21, and a switchboard 11 different from the switchboard 10 of FIG. 21.

The terminals 21, and 31, 32, . . . , and 3n are similar to those of FIG. 21 so that their detail will be omitted. In this case, too, the terminal 21 makes a contract with the multicast PVC with the terminals 31 to 3n and registers it in the system. In this case, the terminal 21 is an outgoing terminal, and the terminals 31 to 3n are incoming terminals.

The switchboard 11 includes a communication controller 42, a multicast server 51, and line accommodators 61, 62, . . . , and 6N, and 71, 72, . . . , and 7n. The switchboard 11 is similar to that of the system of FIG. 21 but for the operations of the communication controller 42. This embodiment will also be described in case the switch system is applied to the frame relay network UNI. This network UNI may be synchronous or asynchronous.

The multicast server 51 is stored with the multicast condition according to the registered content of the multicast PVC between the terminal 21 and the terminals 31 to 3n. The multicast server 51 transfers the data, as received from the terminal 21 through the line accommodator 62, to the communication controller 42 and the data, as sent out from the communication controller 42, to the terminal 21 through the lien accommodator 62.

For the normal data communications, moreover, the multicast server 51 broadcasts the identical data, as fed from the communication controller 42, through the line accommodators 71 to 7n to the terminals 31 to 3n according to the aforementioned multicast conditions. For confirming the PVC status, the multicast server 51 selects a target incoming terminal in accordance with the stored multicast condition and confirms the statuses of the line accommodators 71 to 7n accommodating the corresponding terminals 31 to 3n. Then, the multicast server 51 collects the statuses of the individual line accommodators 71 to 7n and returns the collected information to the communication controller 42.

For the normal data communications, the communication controller 42 subjects the case, as sent from the terminal 21 and transferred from the multicast server 51, to protocols necessary for the data communications, and transfers them as the data, as to be sent to the terminals 31 to 3n, to the multicast server 51.

For confirming the PVC status, on the other hand, the communication controller 42 subjects the SE MESSAGE, as sent from the terminal 21 and received thereby, to a message decision upon whether or not the SE message is effective for the protocols. Then, the communication controller 42 demands the multicast server 51 for the information collection if it decides that the SE message is effective. When the response information of the statuses of the individual line accommodators 71 to 7n, as collected by the multicast server 51, are resultantly returned from the multicast server 51 to the communication controller 42, this communication controller 42 edits the S MESSAGE on the basis of that response information and sends out it to the multicast server 51 to return it to the terminal 21 through the line accommodator 62.

In the case of this embodiment, the communication controller 42 takes an AND among all the statuses of the status informations of the terminals 31 to 3n, as obtained from the line accommodators 71 to 7n through the multicast server 51, and edits the S MESSAGE of the shape, which becomes active only when all the terminals 31 to 3n under the multicast PVC are active.

As to the switch system shown in FIG. 29, here will be described at first the sequence of the case of the normal data communications on the UNI.

(1) The terminal 21 makes a contract of the multicast PVC with the terminals 31 to 3n. This contract is registered in the system. In this case, the multicast condition, as based upon the contract content, is stored in the multicast server 51 of the switchboard 10 or the frame relay network.

(2) When the terminal 21 sends the data, the corresponding line accommodator 62 in the switchboard 10 receives the data and transfers them to the communication controller 42 through the multicast server 51. At this time, what is done by the multicast server 51 is not any special processing but to transfer the data.

(3) The communication controller 42 subjects the received data to the protocols necessary for the ordinary data communications and transfers the resultant data to the multicast server 51 at the output side.

(4) The multicast server 51 broadcasts the identical data to the corresponding terminals 31 to 3n in accordance with its stored multicast condition.

In short, the operations of the communication controller 42 in the sequence of the case of the normal data communications are absolutely identical to those of the case of the communication controller 42 of FIG. 21.

Figure 30:
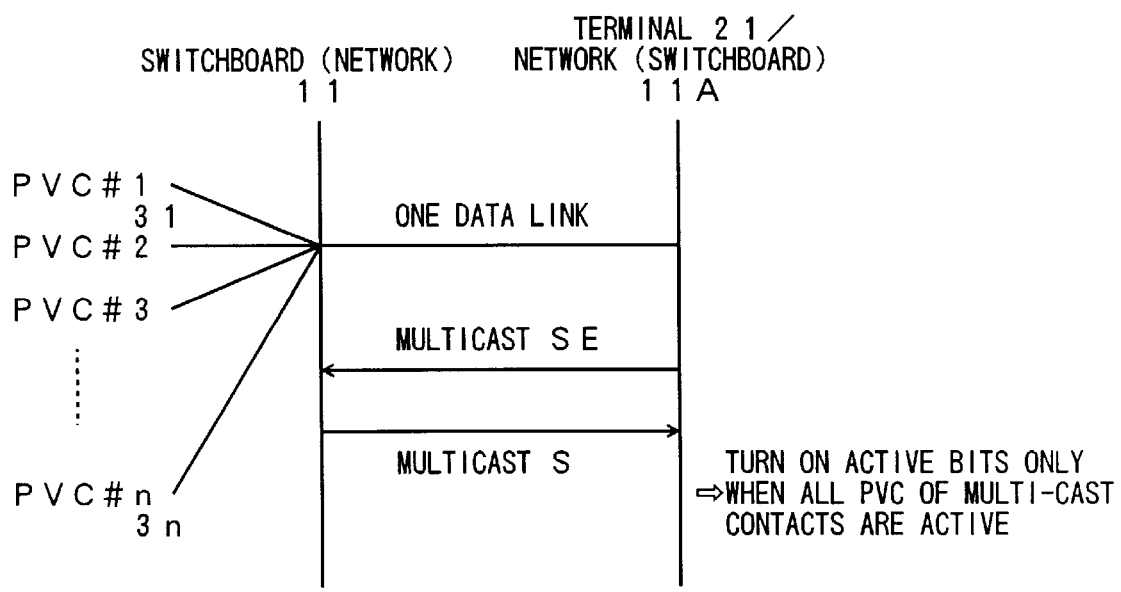
FIG. 30 is a diagram for explaining a multicast status confirmation system of a UNI/UNI according to the system of FIG. 29.

Here will be described the multicast PVC status confirmation sequence on the UNI in the system of FIG. 29. FIG. 30 schematically shows the multicast PVC status-confirmation sequence on the UNI/UNI.

(1) When the terminal 21 transmits the multicast PVC status confirmation demand message, i.e., the multicast SE MESSAGE, the corresponding line accommodator 62 in the switchboard 10 receives the SE MESSAGE and transfers the SE MESSAGE data to the communication controller 42 through the multicast server 51. At this time, what is done by the multicast server 51 is not any special processing of the received data but to transfer the SE MESSAGE to the communication controller 42.

(2) The communication controller 42 decides whether or not the received message is effective for the protocols. The communication controller 42 demands the multicast server 51 to collect the information if it decides that the received message is an effective SE MESSAGE.

(3) Under the stored multicast condition, the multicast server 51 selects the target incoming terminals of the multicast PVC, i.e., the terminals 31 to 3n and confirms the statuses of the line accommodators 71 to 7n for accommodating the subscriber's terminal lines of the corresponding terminals 31 to 3n.

(4) When the multicast server 51 confirms the statuses of the individual line accommodators 71 to 7n and collects the informations, it enumerates the collected informations and returns them to the communication controller 42.

(5) The communication controller 42 edits the multicast PVC status notice message, i.e., the multicast S MESSAGE on the basis of the response informations, as returned from the multicast server 51, and returns it to the terminal 21 through the multicast server 51 and the line accommodator 62.

In this case, the multicast S MESSAGE is edited to contain the status informations, which become active only when all the statuses of the set individual PVC#1, PVC#2, ..., and PVC#n of the multicast PVC are active for one data link from the terminal to the switchboard 10, as conceptionally shown in FIG. 30.

Examples of the specific formats of the SE MESSAGE and the S MESSAGE to be used in the aforementioned frame relay system are shown in FIGS. 25 and 26.

The SE MESSAGE, as shown in FIG. 25, is absolutely similar to that of this system of FIG. 29.

In the S MESSAGE shown in FIG. 26, the informations of the third and subsequent bytes, as indicating the multicast PVC status, are set at 3 bytes (or 3 octets) no matter how many the PVC is, and the active bit A (or the third byte of the third and subsequent bytes, i.e., the fifth byte) is set active at "1" only when the statuses of all the PVC under the multicast PVC are active. The format of the S MESSAGE in this case can be absolutely similar to that of the ordinary PVC status confirming format other than the multicast, but for the information factor identifier of the first byte.

Thus, in the case of the fixed connection communications of the multicast in the network services of the UNI by the frame relay, the connection state such as a breakage of the call-out link connection of the multicast can be confirmed by defining and transferring the connection state notice message, as editing the status information of the call-out link connection under the multicast.

Since the connection status notice message is exemplified by the connection status notice message containing the status information which is active only when all the call-out link connections under the multicast are active, the status of the entire call-out link connection under the multicast can be grasped by the format which is substantially shared with the case of no multicast service.

Embodiment 5

The fourth embodiment of the switch system, in which is incorporated the multicast connection status confirmation system according to the present invention, is an embodiment corresponding to the case in which a switchboard 11 corresponding to the frame relay network is applied in the switch system having a construction similar to that of FIG. 29 to the NNI of the frame relay network, as shown in FIG. 27. The NNI may be synchronous or asynchronous.

In this case, too, the switch system is substantially similar to that shown in FIG. 29, but a more detailed description will be made upon the portions which are different from those of the description of FIGS. 29 and 30.

First of all, for the normal data communications on the NNI, there is interposed between the terminal 21 and the switchboard 11 forming the network another switchboard (or network) 11A which transfers the informations similar to those of the aforementioned terminal 21 of FIG. 29.

The multicast PVC status confirmation sequence on the NNI is schematically shown in FIG. 28.

(1) When the terminal 21 transmits the multicast PVC status confirmation demand message, i.e., the multicast SE MESSAGE through the switchboard 11A, it transfers the SE MESSAGE data to the communication controller 42 through the multicast server 51 in the switchboard 11. At this time, what is done by the multicast server 51 is not to process the received data but to transfer the SE MESSAGE to the communication controller 42.

(2) The communication controller 42 decides whether or not the received message is effective for the protocol regulations. The communication controller 42 demands the multicast server 51 for collecting the information if it is decided that the received message is an effective SE MESSAGE.

(3) The multicast server 51 selects the incoming terminals for the multicast PVC, i.e., the terminals 31 to 3n on the basis of the stored multicast condition and confirms the statuses for the subscriber's terminal lines of the corresponding terminals 31 to 3n.

(4) The multicast server 51, which has collected the information by confirming the status of each subscriber's terminal line, collects and returns the collected informations to the communication controller 42.

(5) The communication controller 42 edits the multicast PVC status notice message, i.e., the multicast S MESSAGE on the basis of the response information, as returned from the multicast server 51, and returns it to the terminal 21 through the multicast server 51 and the switchboard 11A.

In this case, the multicast S MESSAGE is edited to contain the status information, which is active only when all the statuses of the individual PVC#1, PVC#2, ..., and PVC#n of the set multicast PVC are active, for one data link from the terminals to the switchboard 11, as conceptionally shown in FIG. 30.

Similar formats can be used for the NNI as the SE MESSAGE and the S MESSAGE in the aforementioned frame relay system.

Embodiment 6

Figure 31:
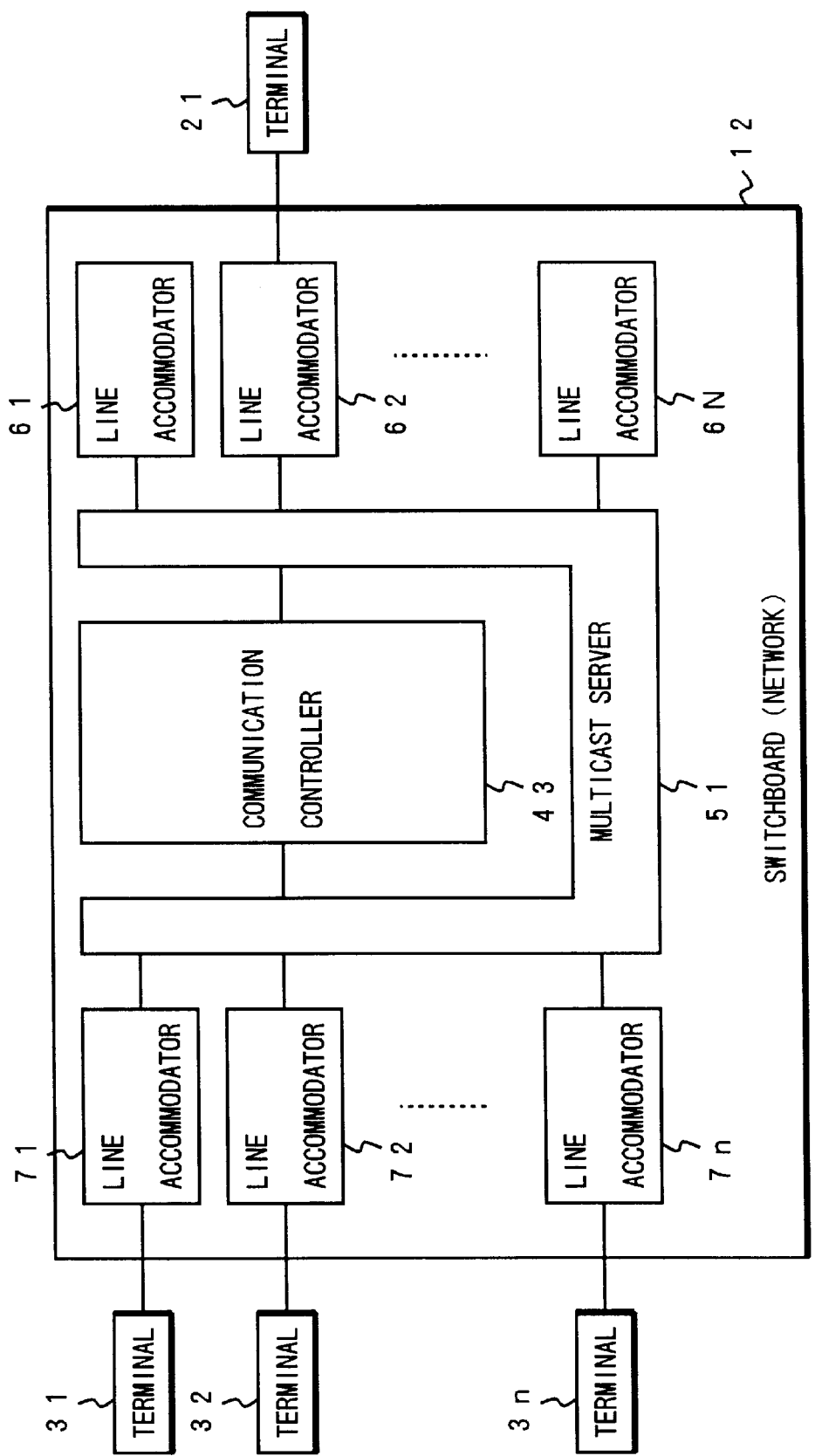
FIG. 31 is a block diagram showing a construction of a switch system according to a fifth embodiment of the present invention for confirming the multicast connection.

FIG. 31 shows a construction of a fifth embodiment of a switch system in which is incorporated the multicast connection status confirmation system according to the present invention.

The switch system of FIG. 31 includes terminals 21, and 31, 32, ..., and 3n similar to those of the system of FIG. 21, and a switchboard 12 different from the switchboard 10 of FIG. 21.

The terminals 21, and 31, 32, ..., and 3n are similar to those of FIG. 21 so that their detail will be omitted. In this case, too, the terminal 21 makes a contract with the multicast PVC with the terminals 31 to 3n and registers it in the system. In this case, the terminal 21 is an outgoing terminal, and the terminals 31 to 3n are incoming terminals.

Figures 32, 33:
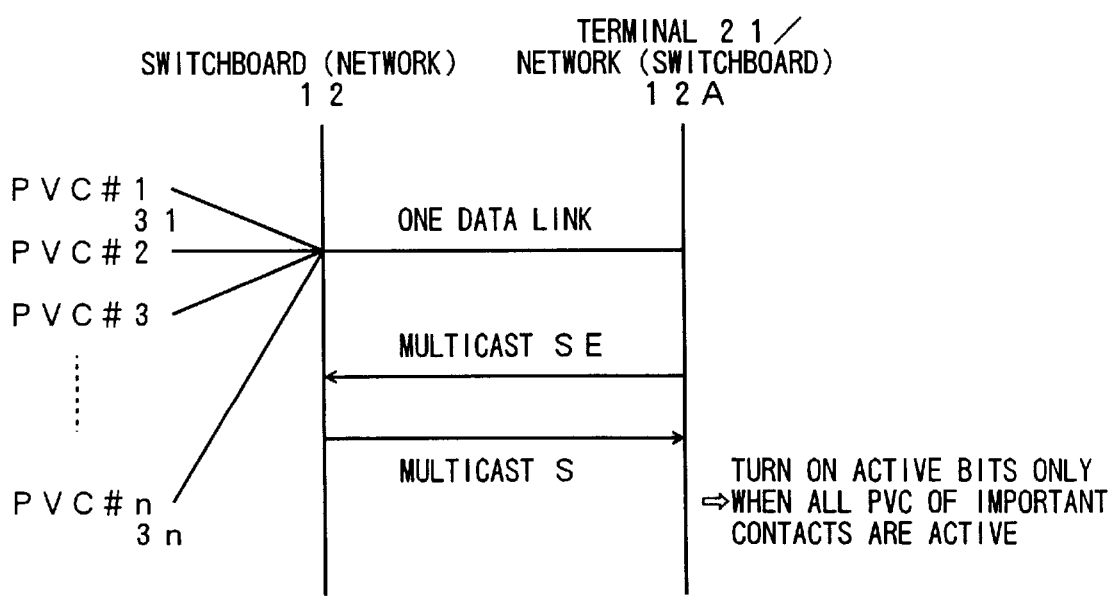
FIG. 32 is a diagram for explaining the management data of a system according to the system of FIG. 31.
FIG. 33 is a diagram for explaining a multicast status confirmation system of a UNI/UNI according to the system of FIG. 31.

Incidentally, in the contract of the multicast PVC of the case of this system, as exemplified by the management data in FIG. 32, contracts are made among the identifiers PVC#1 to PVC#n of the multicast PVC for the call-in terminal, as indicated by the call-in terminal side connection identifier (i.e., DLCI (Data Link Connection Identifier) in the case of the frame relay), the individual call-out addresses such as the communication call-out terminal identifiers, e.g., the communication call-out terminal numbers, and the importances (as indicated by circles "○") of the individual call-out terminals and are registered in advance as the management data and stored in the outgoing terminal 21, the multicast server 51 and so on.

The switchboard 12 includes a communication controller 43, a multicast server 51, and line accommodators 61, 62, . . . , and 6N, and 71, 72, . . . , and 7n. The switchboard 12 is similar to that of the system of FIG. 21 but for the operations of the communication controller 43. This embodiment will also be described in case the switch system is applied to the frame relay network UNI. This network UNI may be synchronous or asynchronous.

The multicast server 51 is stored with the multicast condition, as including the importance (or not) of the call-out party of the multicast PVC, according to the registered content of the multicast PVC between the terminal 21 and the terminals 31 to 3n. The multicast server 51 transfers the data, as received from the terminal 21 through the line accommodator 62, to the communication controller 43 and the data, as sent out from the communication controller 43, to the terminal 21 through the lien accommodator 62.

For the normal data communications, moreover, the multicast server 51 broadcasts the identical data, as fed from the communication controller 43, through the line accommodators 71 to 7n to the terminals 31 to 3n according to the aforementioned multicast conditions. For confirming the PVC status, the multicast server 51 selects a target incoming terminal in accordance with the stored multicast condition and confirms the statuses of the line accommodators 71 to 7n accommodating the corresponding terminals 31 to 3n. Then, the multicast server 51 collects the statuses of the individual line accommodators 71 to 7n and returns the collected information to the communication controller 43.

For the normal data communications, the communication controller 43 subjects the case, as sent from the terminal 21 and transferred from the multicast server 51, to protocols necessary for the data communications, and transfers them as the data, as to be sent to the terminals 31 to 3n, to the multicast server 51.

For confirming the PVC status, on the other hand, the communication controller 43 subjects the SE MESSAGE, as sent from the terminal 21 and received thereby, to a message decision upon whether or not the SE message is effective for the protocols. Then, the communication controller 43 demands the multicast server 51 for the information collection if it decides that the SE message is effective. When the response information of the statuses of the individual line accommodators 71 to 7n, as collected by the multicast server 51, are resultantly returned from the multicast server 51 to the communication controller 43, this communication controller 43 edits the S MESSAGE on the basis of that response information and sends out it to the multicast server 51 to return it to the terminal 21 through the line accommodator 62.

In the case of this embodiment, the communication controller 43 takes an AND among the statuses of all the important ones (as indicated by circles "○" in the importance column in FIG. 32) of the status informations of the terminals 31 to 3n, as obtained from the line accommodators 71 to 7n through the multicast server 51 and managed by the predetermined communication controller 43, and edits the S MESSAGE of the shape, which becomes active only when all the terminals 31 to 3n under the multicast PVC are active.

As to the switch system shown in FIG. 31, here will be described at first the sequence of the case of the normal data communications on the UNI.

(1) The terminal 21 makes a contract of the multicast PVC with the terminals 31 to 3n. This contract is registered in the system. In this case, the multicast condition, as based upon the contract content, is stored in the multicast server 51 of the switchboard 10 or the frame relay network.

(2) When the terminal 21 sends the data, the corresponding line accommodator 62 in the switchboard 10 receives the data and transfers them to the communication controller 43 through the multicast server 51. At this time, what is done by the multicast server 51 is not any special processing but to transfer the data.

(3) The communication controller 43 subjects the received data to the protocols necessary for the ordinary data communications and transfers the resultant data to the multicast server 51 at the output side.

(4) The multicast server 51 broadcasts the identical data to the corresponding terminals 31 to 3n in accordance with its stored multicast condition.

In short, the operations of the communication controller 43 in the sequence of the case of the normal data communications are absolutely identical to those of the case of the communication controller 43 of FIG. 21.

Here will be described the multicast PVC status confirmation sequence on the UNI in the system of FIG. 31. FIG. 32 schematically shows the multicast PVC status confirmation sequence on the UNI/UNI.

(1) When the terminal 21 transmits the multicast PVC status confirmation demand message, i.e., the multicast SE MESSAGE, the corresponding line accommodator 62 in the switchboard 10 receives the SE MESSAGE and transfers the SE MESSAGE data to the communication controller 43 through the multicast server 51. At this time, what is done by the multicast server 51 is not any special processing of the received data but to transfer the SE MESSAGE to the communication controller 43.

(2) The communication controller 43 decides whether or not the received message is effective for the protocols. The communication controller 43 demands the multicast server 51 to collect the information if it decides that the received message is an effective SE MESSAGE.

(3) Under the stored multicast condition, the multicast server 51 selects the target incoming terminals of the multicast PVC, i.e., the terminals 31 to 3n and confirms the statuses of the line accommodators 71 to 7n for accommodating the subscriber's terminal lines of the corresponding terminals 31 to 3n.

(4) When the multicast server 51 confirms the statuses of the individual line accommodators 71 to 7n and collects the informations, it enumerates the collected informations and returns them to the communication controller 43.

(5) The communication controller 43 edits the multicast PVC status notice message, i.e., the multicast S MESSAGE on the basis of the response informations, as returned from the multicast server 51, and returns it to the terminal 21 through the multicast server 51 and the line accommodator 62.

In this case, the multicast S MESSAGE is edited to contain the status informations, which become active only when all the statuses of the set individual PVC#1, PVC#2, ..., and PVC#n of the multicast PVC are active, such as the PVC#1 and PVC#2 which are set as important, for one data link from the terminal to the switchboard 10, as conceptionally shown in FIG. 33.

Examples of the specific formats of the SE MESSAGE and the S MESSAGE to be used in the aforementioned frame relay system are shown in FIGS. 25 and 26.

The SE MESSAGE, as shown in FIG. 25, is absolutely similar to that of this system of FIG. 29.

In the S MESSAGE shown in FIG. 26, the informations of the third and subsequent bytes, as indicating the multicast PVC status, are set at 3 bytes (or 3 octets) no matter how many the PVC is, and the active bit A (or the third byte of the third and subsequent bytes, i.e., the fifth byte) is set active at "1" only when the statuses of all the PVC, as registered to be important, under the multicast PVC are active. The format of the S MESSAGE in this case can be absolutely similar to that of the ordinary PVC status confirming format other than the multicast, but for the information factor identifier of the first byte.

Thus, in the case of the fixed connection communications of the multicast in the network services of the UNI by the frame relay, the connection state such as a breakage of the call-out link connection of the multicast can be confirmed by defining and transferring the connection state notice message, as editing the status information of the call-out link connection under the multicast.

Since the connection status notice message is exemplified by the connection status notice message containing the status information which is active only when all of one or more important call-out link connections, as registered in advance, of the call-out link connections under the multicast are active, the status of the entire call-out link connection under the multicast can be grasped by the format which is substantially shared with the case of no multicast service.

Embodiment 7

The sixth embodiment of the switch system, in which is incorporated the multicast connection status confirmation system according to the present invention, is an embodiment corresponding to the case in which a switchboard 12 corresponding to the frame relay network is applied in the switch system having a construction similar to that of FIG. 31 to the NNI of the frame relay network, as shown in FIG. 27. The NNI may be synchronous or asynchronous.

In this case, too, the switch system is substantially similar to that shown in FIG. 31, but a more detailed description will be made upon the portions which are different from those of the description of FIGS. 31 and 33.

First of all, for the normal data communications on the NNI, there is interposed between the terminal 21 and the switchboard 12 forming the network another switchboard (or network) 12A which transfers the informations similar to those of the aforementioned terminal 21 of FIG. 31.

The multicast PVC status confirmation sequence on the NNI is schematically shown in FIG. 28.

(1) When the terminal 21 transmits the multicast PVC status confirmation demand message, i.e., the multicast SE MESSAGE through the switchboard 12A, it transfers the SE MESSAGE data to the communication controller 43 through the multicast server 51 in the switchboard 12. At this time, what is done by the multicast server 51 is not to process the received data but to transfer the SE MESSAGE to the communication controller 43.

(2) The communication controller 43 decides whether or not the received message is effective for the protocol regulations. The communication controller 43 demands the multicast server 51 for collecting the information if it is decided that the received message is an effective SE MESSAGE.

(3) The multicast server 51 selects the incoming terminals for the multicast PVC, i.e., the terminals 31 to 3n on the basis of the stored multicast condition and confirms the statuses for the subscriber's terminal lines of the corresponding terminals 31 to 3n.

(4) The multicast server 51, which has collected the information by confirming the status of each subscriber's terminal line, collects and returns the collected informations to the communication controller 43.

(5) The communication controller 43 edits the multicast PVC status notice message, i.e., the multicast S MESSAGE on the basis of the response information, as returned from the multicast server 51, and returns it to the terminal 21 through the multicast server 51 and the switchboard 12A.

In this case, the multicast S MESSAGE is edited to contain the status information, which is active only when all the statuses of the individual PVC#1, PVC#2, . . . , and PVC#n of the set multicast PVC are active, for one data link from the terminals to the switchboard 12, as conceptionally shown in FIG. 30.

Similar formats can be used for the NNI as the SE MESSAGE and the S MESSAGE in the aforementioned frame relay system.

In the foregoing individual embodiments, the description has been limited to the relay type package mode communication system for the data link layer frames and the frame relay for communications by relaying the data at the frame levels of the data link layers. Despite of this description, however, the present invention can also be embodied like the foregoing embodiments by the cell relay, as compared with the frame relay, as the high speed packet communication system for segmenting and relay-transferring the communication data in the network. The cell relay is known as the relay type packet mode communication system for the physical layer cells and relays the data for communications at the cell levels of the physical layers. Here will be described embodiments in which the present invention is applied to the cell relay.

Embodiment 8

A seventh embodiment of the switch system, in which is incorporated the multicast connection status confirmation system according to the present invention, is applied to the UNI like the system shown in FIGS. 21 to 24 and is a switch system having a construction substantially similar to that shown in FIGS. 21 to 24. Specifically, this system is modified from the switch system shown in FIGS. 21 to 24 such that the switchboard 10 is exemplified by an ATM switchboard of cell relay network and that the terminals 21 and 31 to 3n are exemplified by ATM terminals.

Since the network system is exemplified in this case by a cell relay network system, the switchboard 10 is the ATM switchboard of cell relay network, and the terminals 21 and 31 to 3n are the ATM terminals, but the remaining actions and operations accord to those of the case of FIGS. 21 to 24.

The multicast S MESSAGE is edited to contain the status informations, in which the statuses of the set individual PVC#1, PVC#2, . . . , and PVC#n of the multicast PVC are enumerated for one data link from the terminal to the switchboard 10, as conceptionally shown in FIG. 24.

Figure 35:
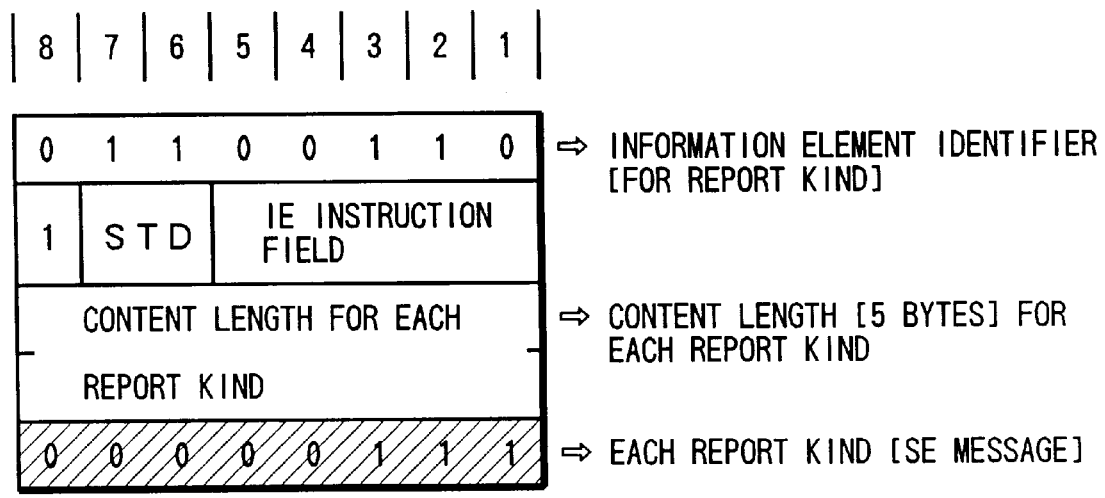
FIG. 35 is a diagram for explaining an example of the format of an SE message of a multicast PVC in a cell relay system.
Figure 36:
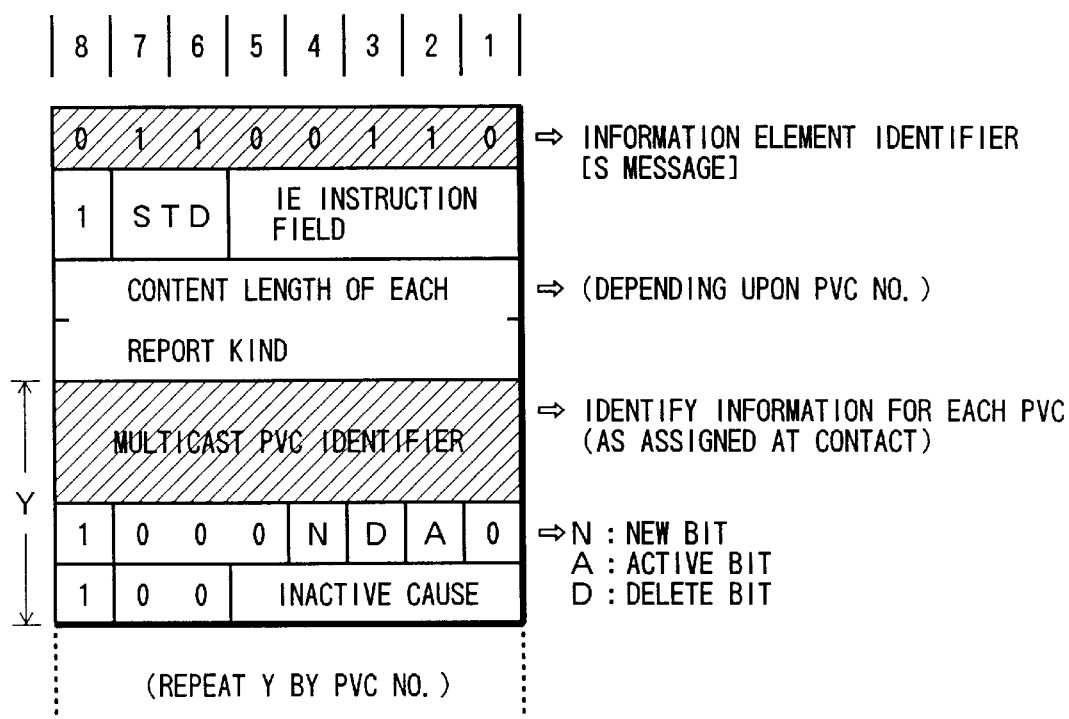
FIG. 36 is a diagram for explaining an example of the format of an S message of the multicast PVC in the cell relay system.

The specific examples of the formats of the SE MESSAGE and the S MESSAGE, which can be used in the aforementioned cell relay system, are shown in FIGS. 35 and 36.

FIGS. 35 and 36 correspond to FIGS. 25 and 26 of the frame relay case and respectively show the formats of the SE MESSAGE and the S MESSAGE for confirming the multicast PVC status, as corresponding to the format of the SPC (Semi-Permanent Virtual Channel Connection) indicated in Appendix III of Q.2931 of ITU-T or the standard specifications of the cell relay system. Here, the SPC in the cell relay implies the semi-fixed connection which has an incoming notice procedure mainly in the ISDN interface and is difference from the PVC in a strict sense but may be accepted in this case as one kind of the fixed connection substantially similar to the PVC.

FIG. 35 shows a format for defining the information on each report kind, as indicating the SE MESSAGE. In this case, the bit numbers 8 to 1 of the first byte (or first octet) are information element identifiers and are expressed by "01100110" indicating the information for each SPC report kind. In the second byte: the bit number 8 indicates the extension at "1"; the bit numbers 7 and 6 indicate the coding standards; and the bit numbers 5 to 1 indicate the information element instruction fields. The third and fourth bytes indicate the content length of each report kind and have data indicating 5 bytes (or 5 octets). The fifth byte is the information indicating the report kind and is indicated by "00000111", for example, as not defined in the aforementioned standards, so as to indicate the status confirmation (or demand) of the multicast PVC.

FIG. 36 shows a format for defining the information relating to the information element identification, as indicating the S MESSAGE, and the status confirmation information of the multicast PVC status. In this case, the bit numbers 8 to 1 of the first byte (or first octet) are the information element identifiers and are expressed by "01100111" indicating the multicast PVC status confirmation information. In the second byte: the bit number 8 indicates the extension at "1"; the bit numbers 7 and 6 indicate the coding standards; and the bit numbers 5 to 1 indicate the information element instruction fields. The third and fourth bytes indicate the content lengths of each report kind and have the data of the information depending upon the registered PVC number because all the informations in the PVC statuses are enumerated in this case.

Moreover, the fifth or later byte is the information indicating the multicast PVC status and is composed of 4 bytes (or 4 octets) for one PVC to have (4×the number of PVC) bytes.

In every four bytes, the first two bytes are the data link connection identifiers indicating the multicast PVC identifiers. In the third byte, the bit number 8 is set at "1" or "0", as indicating the extension; the bit number 4 is set at the new bit N, as indicating whether it is new or not; the bit number 3 is set at a delete bit D, as indicating whether it is to be deleted or not; and the bit number 2 is set at A, as indicating whether it is active or not. The NEW BIT N implies that it is already given, if at "0", but that it is new, if at "1". The ACTIVE BIT A implies that it is inactive, if at "0", but that it is active, if at "1". In the fourth byte, the bit number 8 is set at "1", as indicating the extension, and the bit numbers 5 to 1 have informations indicating the inactive reasons.

The remainders (i.e., the bit numbers 7 to 5 and the bit number 1 of the third byte, and the bit numbers 7 and 6 of the fourth byte) are all the preparatory bits and are set to "0" in this case.

As described above, the aforementioned first two bytes are the identification numbers which are given in advance to each multicast PVC. These identification numbers are assigned at the contract of the multicast PVC between the terminals and the network or between the networks.

Thus, in the case of the fixed connection communications of the multicast in the network services of the UNI by the cell relay, the connection state such as a breakage of the call-out link connection of the multicast can be confirmed by defining and transferring the connection state notice message, as editing the status information of the call-out link connection under the multicast.

In this case, the aforementioned S MESSAGE is exemplified by the connection status notice message in which all the status informations of the call-out link connection under the multicast are enumerated, so that the individual statuses of the call-out link connections under the multicast can be specifically grasped.

Embodiment 9

Figure 37:
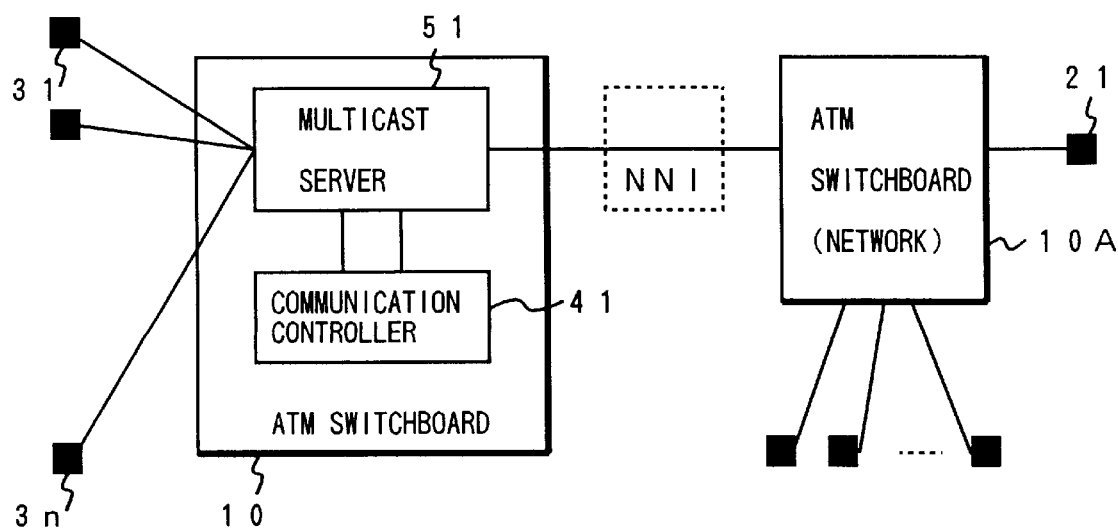
FIG. 37 is a system block diagram for explaining the status confirmation of a cell relay UNI of a switch system according to a ninth embodiment of the present invention for confirming the multicast connection.

An eighth embodiment of the switch system, in which is incorporated the multicast connection status confirmation system according to the present invention, is an embodiment corresponding to the case in which a switchboard 10 or the ATM switchboard of the cell relay network is applied in the switch system having a construction similar to that of FIG. 21 to the NNI of the cell relay network, as shown in FIG. 37. In this case, too, the NNI may be synchronous or asynchronous.

Figure 34:
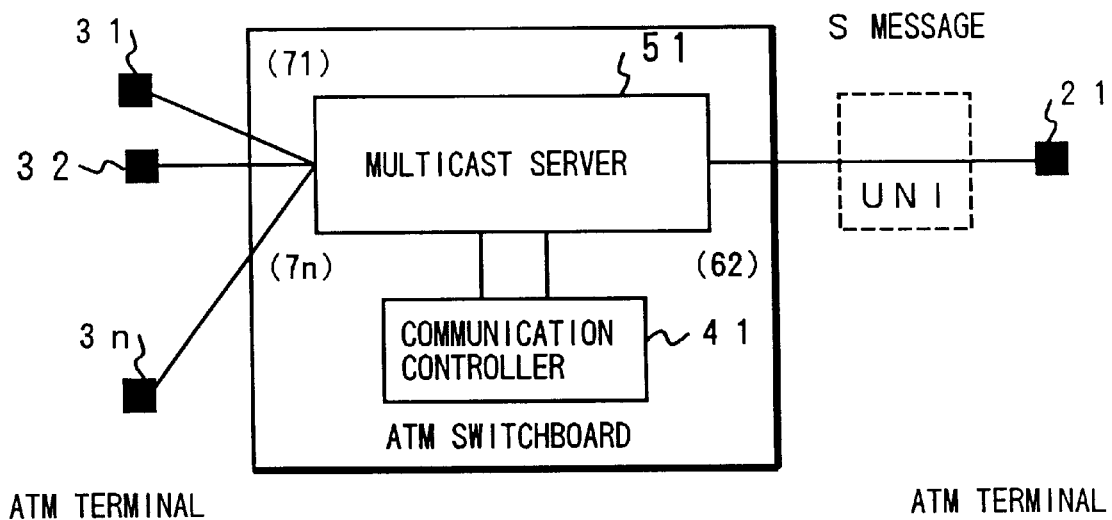
FIG. 34 is a system block diagram for explaining the status confirmation of a cell relay UNI of a switch system according to a seventh embodiment of the present invention for confirming the multicast connection.

For the normal data communications on the NNI, there is interposed between the terminal 21 and the switchboard (or network) 10 another switchboard (or network) 10A which transfers the informations similar to those of the aforementioned terminal 21 of FIG. 34.

The multicast S MESSAGE is edited to contain the status information, in which the statuses of the individual PVC#1, PVC#2, . . . , and PVC#n of the set multicast PVC are enumerated for one data link from the terminals to the switchboard 10, as conceptionally shown in FIG. 24.

Formats similar to those of the embodiment shown in FIGS. 35 and 36 can be used for the NNI as the SE MESSAGE and the S MESSAGE in the aforementioned cell relay system.

Embodiment 10

The switch system of FIG. 29, as has been described in the foregoing third embodiment, can also be applied not to the frame relay but to the cell relay. This is a ninth embodiment of the switch system, in which is incorporated the multicast connection status confirmation system according to the present invention.

This embodiment is similar to the switch system of FIG. 29 but for that the frame relay is replaced by the cell relay and that the switchboard 11 is replaced by the ATM switchboard.

The multicast server 51 is stored with the multicast condition according to the registered content of the multicast PVC between the terminal 21 and the terminals 31 to 3n. The multicast server 51 transfers the data, as received from the terminal 21 through the line accommodator 62, to the communication controller 42 and the data, as sent out from the communication controller 42, to the terminal 21 through the lien accommodator 62.

For the normal data communications, the multicast server 51 broadcasts the identical data, as fed from the communication controller 42, through the line accommodators 71 to 7n to the terminals 31 to 3n according to the aforementioned multicast conditions. For confirming the PVC status, the multicast server 51 selects a target incoming terminal in accordance with the stored multicast condition and confirms the statuses of the line accommodators 71 to 7n accommodating the corresponding terminals 31 to 3n. Then, the multicast server 51 collects the statuses of the individual line accommodators 71 to 7n and returns the collected information to the communication controller 42.

For the normal data communications, the communication controller 42 subjects the case, as sent from the terminal 21 and transferred from the multicast server 51, to protocols necessary for the data communications, and transfers them as the data, as to be sent to the terminals 31 to 3n, to the multicast server 51.

For confirming the PVC status, on the other hand, the communication controller 42 subjects the SE MESSAGE of the cell relay, as sent from the terminal 21 and received thereby, to a message decision upon whether or not the SE message is effective for the protocols. Then, the communication controller 42 demands the multicast server 51 for the information collection if it decides that the SE message is effective. When the response information of the statuses of the individual line accommodators 71 to 7n, as collected by the multicast server 51, are resultantly returned from the multicast server 51 to the communication controller 42, this communication controller 42 edits the S MESSAGE of the cell relay on the basis of that response information and sends out it to the multicast server 51 to return it to the terminal 21 through the line accommodator 62.

In the case of this embodiment, the communication controller 42 takes an AND among all the statuses of the status informations of the terminals 31 to 3n, as obtained from the line accommodators 71 to 7n through the multicast server 51, and edits the S MESSAGE of the shape, which becomes active only when all the terminals 31 to 3n under the multicast PVC are active.

In the aforementioned cell relay system, too, there can be used the formats of the SE MESSAGE and the S MESSAGE, as shown in FIGS. 35 and 36.

In the S MESSAGE of this case shown in FIG. 36, the informations of the fifth and subsequent bytes, as indicating the multicast PVC status, are set at 4 bytes (or 4 octets) no matter how many the PVC is, and the active bit A (or the third byte of the fifth and subsequent bytes, i.e., the bit number 2 of the seventh byte) is set active at "1" only when the statuses of all the PVC under the multicast PVC are active. The format of the S MESSAGE in this case can be absolutely similar to that of the ordinary PVC status confirming format other than the multicast, but for the information factor identifier of the first byte.

Thus, in the case of the fixed connection communications of the multicast in the network services of the UNI by the cell relay, the connection state such as a breakage of the call-out link connection of the multicast can be confirmed by defining and transferring the connection state notice message, as editing the status information of the call-out link connection under the multicast.

Since the connection status notice message is exemplified by the connection status notice message containing the status information which is active only when all the call-out link connections under the multicast are active, the status of the entire call-out link connection under the multicast can be grasped by the format which is substantially shared with the case of no multicast service.

Moreover, the switchboard 11, as made of the ATM switchboard of the cell relay network of the switch system having a construction similar to that of FIG. 29, may be applied to the NNI as in the case of the fourth embodiment in the frame relay. In this case, for the normal data communications on the NNI, there is interposed between the terminal 21 and the switchboard 11 composing the network another switchboard (or network) 11A for switching the informations as in the aforementioned terminal 21 of FIG. 29.

Embodiment 11

The switch system of FIG. 31, as has been described in the fifth embodiment, can also be applied not to the frame relay but to the cell relay. This is a tenth embodiment of the switch system in which is incorporated the multicast connection status confirmation system according to the present invention.

The switch system of FIG. 31 has the switchboard 12 which is different from the switchboard 10 of FIG. 21.

The contracts of the multicast PVC of the case of this system are made, as exemplified in the management data in FIG. 32, among the identifiers PVC#1 to PVC#3 of the multicast PVC for the call-in terminal, as indicated by the call-in terminal side connection identifier (or the cell relay, i.e., VPI (Virtual Path Identifier)/VCI (Virtual Channel Identifier)), the communication call-out terminal identifiers such as their individual call-out addresses or the importances of the individual call-out terminals. These contacts are registered in advance as the management data and stored in the outgoing terminal 21, the multicast server 51 and so on.

The multicast server 51 is stored with the multicast condition, as including the importance or not of the call-out party of the multicast PVC, according to the registered content of the multicast PVC between the terminal 21 and the terminals 31 to 3n. The multicast server 51 transfers the data, as received from the terminal 21 through the line accommodator 62, to the communication controller 43 and the data, as sent out from the communication controller 43, to the terminal 21 through the lien accommodator 62.

For the normal data communications, the multicast server 51 broadcasts the identical data, as fed from the communication controller 43, through the line accommodators 71 to 7n to the terminals 31 to 3n according to the aforementioned multicast conditions. For confirming the PVC status, the multicast server 51 selects a target incoming terminal in accordance with the stored multicast condition and confirms the statuses of the line accommodators 71 to 7n accommodating the corresponding terminals 31 to 3n. Then, the multicast server 51 collects the statuses of the individual line accommodators 71 to 7n and returns the collected information to the communication controller 43.

For the normal data communications, the communication controller 43 subjects the case, as sent from the terminal 21 and transferred from the multicast server 51, to protocols necessary for the data communications, and transfers them as the data, as to be sent to the terminals 31 to 3n, to the multicast server 51.

For confirming the PVC status, on the other hand, the communication controller 43 subjects the SE MESSAGE, as sent from the terminal 21 and received thereby, to a message decision upon whether or not the SE message is effective for the protocols. Then, the communication controller 43 demands the multicast server 51 for the information collection if it decides that the SE message is effective. When the response information of the statuses of the individual line accommodators 71 to 7n, as collected by the multicast server 51, are resultantly returned from the multicast server 51 to the communication controller 43, this communication controller 43 edits the S MESSAGE on the basis of that response information and sends out it to the multicast server 51 to return it to the terminal 21 through the line accommodator 62.

Here, the communication controller 43 takes an AND among the statuses of all the important ones (as indicated by circles "○" in the importance column in FIG. 32) of the status informations of the terminals 31 to 3n, as obtained from the line accommodators 71 to 7n through the multicast server 51 and managed by the predetermined communication controller 43, and edits the S MESSAGE of the shape, which becomes active only when all the terminals 31 to 3n under the multicast PVC are active.

The multicast S MESSAGE is edited to contain the status informations, which become active only when all the statuses of the set individual PVC#1, PVC#2, . . . , and PVC#n of the multicast PVC are active, such as the PVC#1 and PVC#2 which are set as important, for one data link from the terminal to the switchboard 12, as conceptionally shown in FIG. 33.

In the aforementioned cell relay system, too, there can be used the formats of the SE MESSAGE and the S MESSAGE, as shown in FIGS. 35 and 36.

In the S MESSAGE of this case shown in FIG. 36, the informations of the fifth and subsequent bytes, as indicating the multicast PVC status, are set at 4 bytes (or 4 octets) no matter how many the PVC is, and the active bit A (or the third byte of the fifth or subsequent bytes, i.e., the bit number 2 of the seventh byte) is set active at "1" only when the statuses of all the PVC, as registered to be important, under the multicast PVC are active. The format of the S MESSAGE in this case can be absolutely similar to that of the ordinary PVC status confirming format other than the multicast, but for the information factor identifier of the first byte.

Thus, in the case of the fixed connection communications of the multicast in the network services of the UNI by the cell relay, the connection state such as a breakage of the call-out link connection of the multicast can be confirmed by defining and transferring the connection state notice message, as editing the status information of the call-out link connection under the multicast.

Since the connection status notice message is exemplified by the connection status notice message containing the status information which is active only when all of one or more important call-out link connections, as registered in advance, of the call-out link connections under the multicast are active, the status of the entire call-out link connection under the multicast can be grasped by the format which is substantially shared with the case of no multicast service.

Moreover, the switchboard 12, as made of the ATM switchboard of the cell relay network of the switch system having a construction similar to that of FIG. 31, may be applied to the NNI as in the case of the sixth embodiment in the frame relay. For the normal data communications of this case on the NNI, there is interposed between the terminal 21 and the switchboard 12 composing the network another switchboard (or network) 12A for switching the informations similar to the aforementioned terminal 21 of FIG. 31.

Embodiment 12

Figure 38:
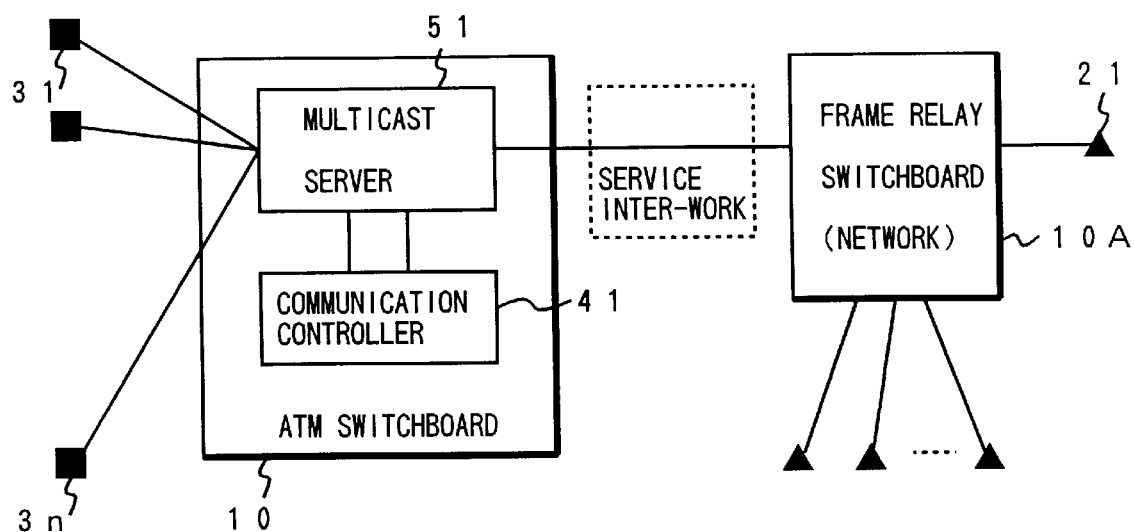
FIG. 38 is a system block diagram for explaining the status confirmation in a service inter-work between the frame relay network—the cell relay network of a switch system according to an eleventh embodiment of the present invention for confirming the multicast connection.

An eleventh embodiment of the switch system, in which is incorporated the multicast connection status confirmation system according to the present invention, is the switch system which is applied to the service interwork between the frame relay network and the cell relay network. Specifically, this system is modified from the switch system shown in FIGS. 21 to 24 such that the switchboard 10 is exemplified by the ATM switchboard of cell relay network, as shown in FIG. 38 substantially corresponding to FIG. 27, such that the terminals 31 to 3n are exemplified by the ATM terminals, such that the terminal 21 is exemplified by the frame relay terminal, and such that the frame relay switchboard (or frame relay network) 10A is interposed between the terminal 21 and the ATM switchboard 10 so that the switchboard 10A may switch the informations similar to those of the aforementioned terminal 21 of FIGS. 21 and 22. In short, since this switch system is provided over the frame relay network system and the cell relay network system: the switchboard 10 is the ATM switchboard of the cell relay network; the switchboard 10A is the ATM switchboard of the frame relay network; the terminal 21 is the frame relay terminal; and the terminals 31 to 3n are the ATM terminals.

The multicast PVC status confirmation sequence on the service interwork is schematically shown in FIG. 39.

(1) When the frame relay terminal 21 transmits the multicast PVC status confirmation demand message, i.e., the multicast SE MESSAGE through the frame relay switchboard 10A, it transfers the SE MESSAGE data to the communication controller 41 through the multicast server 51 in the ATM switchboard 10. At this time, what is done by the multicast server 51 is not to process the received data but to transfer the SE MESSAGE to the communication controller 41.

(2) The communication controller 41 decides whether or not the received message is effective for the protocol regulations. The communication controller 41 demands the multicast server 51 for collecting the information if it is decided that the received message is an effective SE MESSAGE.

(3) The multicast server 51 selects the incoming terminals for the multicast PVC, i.e., the ATM terminals 31 to 3n on the basis of the stored multicast condition and confirms the statuses for the subscriber's terminal lines of the corresponding terminals 31 to 3n.

(4) The multicast server 51, which has collected the information by confirming the status of each subscriber's terminal line, collects and returns the collected informations to the communication controller 41.

(5) The communication controller 41 edits the multicast PVC status notice message, i.e., the multicast S MESSAGE on the basis of the response information, as returned from the multicast server 51, and returns it to the terminal 21 through the multicast server 51 and the switchboard frame relay 10A.

In the first pattern of this case, the multicast S MESSAGE is edited to contain the status information, in which the statuses of the individual PVC#1, PVC#2, . . . , and PVC#n of the set multicast PVC are enumerated for one data link from the terminals to the switchboard 10, as conceptionally shown in FIG. 24.

In the second pattern, the multicast S MESSAGE is edited to contain the status informations, which become active only when all the statuses of the individual PVC#1, PVC#2, . . . , and PVC#n of the set multicast PVC are active for one data link from the terminal to the switchboard 10.

In the third pattern, the multicast S MESSAGE is edited to contain the status informations, which become active only when all the statuses of the important ones of the individual PVC#1, PVC#2, . . . , and PVC#n of the set multicast PVC are active for one data link from the terminal to the switchboard 10.

In the case of the aforementioned service interwork, the cell format is transformed between the ATM switchboard 10 and the frame relay switchboard 10A so that the formats of the SE MESSAGE and the S MESSAGE are also transformed.

As has been described hereinbefore, according to the present invention, it is possible to provide a multicast connection status confirmation method and apparatus, in which when the fixed connection communications of the multicast are to be effected in the network service of relay type such as the frame relay or the cell relay, the connection status such as the disconnection of the outgoing link connection of the multicast can be confirmed by defining the connection status notice image in which the status informations of the outgoing link connection under the multicast are edited.

If the aforementioned connection status notice message is exemplified by the connection status notice image, in which all the status informations of the outgoing link connection under the multicast are enumerated, the individual statuses of the outgoing link connection under the multicast can be specifically grasped although the different is different from that of the case other than the multicast service.

If the aforementioned connection status notice message is exemplified by the connection status notice message containing the status information which activates the status information only when all the outgoing link connections under the multicast are active, the status of the entire outgoing link connection under the multicast can be grasped with the format which is similar to that of the case other than the multicast service.

If the connection status notice message is exemplified by the connection status notice message containing the status information which activates the status information only when all the one or more previously registered outgoing link connections under the multicast are active, the necessary status of the entire outgoing link connections under the multicast can be grasped with the format which is similar to that of the case other than the multicast service.

What is claimed is:

1. A multi-connection management method in a switch system for managing the multi-connections in a switch system, comprising:

holding statuses for each connection and managing said statuses;

preparing, for each connection, management areas for managing the various statuses of said connections and the number of connections in each of said statuses; and managing said connections with two points of the statuses for each of said statuses and the number of said statuses of each connection.

2. A multi-connection management method in a switch system for managing the multi-connections in a switch system, comprising:

preparing dedicated for managing the number of statuses of each interface by making said interface into a virtual connection and giving a status to said interface; and managing the multi-connection interfaces by managing the number of interfaces of each of said statuses.

3. A multi-connection management method in a switch system for managing the multi-connections in a switch system, comprising:

preparing a plurality of connection management memories for managing each connecting including the statuses of the multi-connections and one call control memory for controlling calls; and managing said connection management memories commonly by the entire system and managing the same by said call control memory.

4. A multi-connection management method in a switch system for managing the multi-connections in a switch system, comprising:

preparing connection status control memories for managing the statuses of said multi-connections, a connection control memory linked to said connection status control memories for managing the information of the connection other than a status number, and one call control memory for controlling calls; and managing said connection status control memories commonly by the entire system and managing the same by said call control memory.

5. A multi-connection management apparatus for a switch system, comprising:

connection status hold means provided for each connection for holding status information;

status management means for managing the status information which is held by said connection status hold means; and connection management means for managing the multi-connections with both the status of each connection and each status number of each connection of each interface.

6. A multi-connection management apparatus for a switch system, comprising:

status number management information storage means for storing the status number management information of each interface by making said interface into a virtual connection and by giving a status to said interface; and interface management means for managing the multi-connection interfaces with the interface number for each status according to said status number management information.

7. A multi-connection management apparatus for a switch system, comprising:

a plurality of connection management information memory means for storing connection management information for managing each of multi-connections including their statuses;

one call control information memory means for storing call control information for controlling calls;

connection management information management means for managing said connection management information memory means commonly by the entire system; and memory management means for managing said connection management information memory means by said call control information memory means.

8. A multi-connection management apparatus for a switch system, comprising:

connection status control information memory means for storing connection status control information for managing the statuses of multi-connections;

connection control information memory means linked to said connection status control information memory means for storing connection control information for managing the information of the connection other than a status number;

one call control information memory means for storing call control information for controlling calls;

connection status control information management means for managing said connection status control information memory means commonly by the entire system; and memory management means for managing said connection status control information memory means by said call control information memory means.

9. A multicast connection status confirmation method for multicast services for broadcast communications, in which at least one of link connections of fixed connection is a plurality over a high speed packet communication system for segmenting communication data and relay-transferring them in a network, comprising:

producing a connection status notice message, in which the status information of all the outgoing link connections under a multicast are enumerated; and confirming the connection status of each of the link connections of the multicast.

10. A multicast connection status confirmation method according to claim 9, wherein said high speed packet communication system is a frame relay network system.

11. A multicast connection status confirmation method according to claim 9,
wherein said high speed packet communication system is a cell relay network system.

12. A multicast connection status confirmation method according to claim 9,
wherein the connection status confirmation by the connection status notice message of each link connection of the multicast is applied to the link connection of a user network interface.

13. A multicast connection status confirmation method according to claim 9,
wherein the connection status confirmation by the connection status notice message of each link connection of the multicast is applied to the link connection of an inter-network interface.

14. A multicast connection status confirmation method according to claim 9,
wherein the connection status confirmation by the connection status notice message of each link connection of the multicast is applied to an inter-working function between a frame relay network and a cell relay network.

15. A multicast connection status confirmation method according to claim 9,
wherein the link connections of fixed connection include link connections of semi-fixed connection.

16. A multicast connection status confirmation method for multicast services for broadcast communications, in which at least one of link connections of fixed connection is a plurality over a high speed packet communication system for segmenting communication data and relay-transferring them in a network, comprising:
producing a connection status notice message including the status information, in which the status is activated only when all the outgoing link connections under a multicast are active; and
confirming the connection status of the link connections of the multicast.

17. A multicast connection status confirmation method according to claim 16,
wherein said high speed packet communication system is a frame relay network system.

18. A multicast connection status confirmation method according to claim 16,
wherein said high speed packet communication system is a cell relay network system.

19. A multicast connection status confirmation method according to claim 16,
wherein the connection status confirmation by the connection status notice message of each link connection of the multicast is applied to the link connection of a user network interface.

20. A multicast connection status confirmation method according to claim 16,
wherein the connection status confirmation by the connection status notice message of each link connection of the multicast is applied to the link connection of an inter-network interface.

21. A multicast connection status confirmation method according to claim 16,
wherein the connection status confirmation by the connection status notice message of each link connection of the multicast is applied to an inter-working function between a frame relay network and a cell relay network.

22. A multicast connection status confirmation method according to claim 16,
wherein the link connections of fixed connection include link connections of semi-fixed connection.

23. A multicast connection status confirmation method for multicast services for broadcast communications, in which at least one of link connections of fixed connection is a plurality over a high speed packet communication system for segmenting communication data and relay-transferring them in a network, comprising:
registering at least one of the important ones of the outgoing link connections under a multicast, in advance, at the time of registering a multicast contract;
producing a connection status notice message including status information of all the outgoing link connections under a multicast are enumerated, in which the status is activated only when all of said important ones of the outgoing link connections under a multicast are active; and
confirming the connection status of the link connections of the multicast.

24. A multicast connection status confirmation method according to claim 23,
wherein said high speed packet communication system is a frame relay network system.

25. A multicast connection status confirmation method according to claim 23,
wherein said high speed packet communication system is a cell relay network system.

26. A multicast connection status confirmation method according to claim 23,
wherein the connection status confirmation by the connection status notice message of each link connection of the multicast applied to the link connection of a user network interface.

27. A multicast connection status confirmation method according to claim 23,
wherein the connection status confirmation by the connection status notice message of each link connection of the multicast is applied to the link connection of an inter-network interface.

28. A multicast connection status confirmation method according to claim 23,
wherein the connection status confirmation by the connection status notice message of each link connection of the multicast is applied to an inter-working function between a frame relay network and a cell relay network.

29. A multicast connection status confirmation method according to claim 23,
wherein the link connections of fixed connection include link connections of semi-fixed connection.

30. A multicast connection status confirmation apparatus for a high speed packet communication system for providing services including multicast services for broadcast communications, in which at least one of link connections of fixed connection is a plurality by a high-speed packet communication for segmenting communication data and relay-transferring them in a network, comprising:
status collection means for collecting the status information of all the outgoing link connections under the multicast in response to a connection status confirmation demand message;
message edition means for editing the connection status notice message, in which the status informations of all the outgoing link connections under the multicast are enumerated, on the basis of the collection result by said status collection means; and transfer control means for receiving said connection status confirmation demand message from a connection status confirmation demanding connection and feeding it to said status collection means and for returning the connection status notice message, which is edited by said message edition means, to said connection status confirmation demanding connection.

31. A multicast connection status confirmation apparatus according to claim 30, wherein said high speed packet communication system is a frame relay network system.

32. A multicast connection status confirmation apparatus according to claim 30, wherein said high speed packet communication system is a cell relay network system.

33. A multicast connection status confirmation apparatus according to claim 30, wherein one of said link connections is a link connection of a user network interface.

34. A multicast connection status confirmation apparatus according to claim 30, wherein one of said link connections is a link connection of an inter-network interface.

35. A multicast connection status confirmation apparatus according to claim 30, wherein one of said link connections is a link connection of by an inter-working function between a frame relay network and a cell relay network.

36. A multicast connection status confirmation apparatus according to claim 30, wherein the link connections of fixed connection include link connections of semi-fixed connection.

37. A multicast connection status confirmation apparatus for a high speed packet communication system for providing services including multicast services for broadcast communications, in which at least one of link connections of fixed connection is a plurality by a high speed packet communication for segmenting communication data and relay-transferring them in a network, comprising:

status collection means for collecting the status information of all the outgoing link connections under the multicast in response to a connection status confirmation demand message;

message edition means for editing the connection status notice message including the status information, in which the status is activated only when all the outgoing link connections under the multicast are active, on the basis of the collection result by said status collection means; and transfer control means for receiving said connection status confirmation demand message from a connection status confirmation demanding connection and feeding it to said status collection means and for returning the connection status notice message, which is edited by said message edition means, to said connection status confirmation demanding connection.

38. A multicast connection status confirmation apparatus according to claim 37, wherein said high speed packet communication system is a frame relay network system.

39. A multicast connection status confirmation apparatus according to claim 37, wherein said high speed packet communication system is a cell relay network system.

40. A multicast connection status confirmation apparatus according to claim 37, wherein one of said link connections is a link connection of a user network interface.

41. A multicast connection status confirmation apparatus according to claim 37, wherein one of said link connections is a link connection of an inter-network interface.

42. A multicast connection status confirmation apparatus according to claim 37, wherein one of said link connections is a link connection of by an inter-working function between a frame relay network and a cell relay network.

43. A multicast connection status confirmation apparatus according to claim 37, wherein the link connections of fixed connection include link connections of semi-fixed connection.

44. A multicast connection status confirmation apparatus for a high speed packet communication system for providing services including multicast services for broadcast communications, in which at least one of link connections of fixed connection is a plurality by a high speed packet communication for segmenting communication data and relay-transferring them in a network, comprising:

important outgoing side registration means for registering in advance at least one of important ones of the outgoing link connections under a multicast;

status collection means for collecting the status information of all the outgoing link connections under the multicast in response to a connection status confirmation demand message;

message edition means for editing the connection status notice message including the status information, in which the status is activated only when all of said at least one of important ones of the outgoing link connections under the multicast are active, on the basis of the collection result by said status collection means; and transfer control means for receiving said connection status confirmation demand message from a connection status confirmation demanding connection and feeding it to said status collection means and for returning the connection status notice message, which is edited by said message edition means, to said connection status confirmation demanding connection.

45. A multicast connection status confirmation apparatus according to claim 44, wherein said high speed packet communication system is a frame relay network system.

46. A multicast connection status confirmation apparatus according to claim 44, wherein said high speed packet communication system is a cell relay network system.

47. A multicast connection status confirmation apparatus according to claim 44, wherein one of said link connections is a link connection of a user network interface.

48. A multicast connection status confirmation apparatus according to claim 44, wherein one of said link connections is a link connection of an inter-network interface.

49. A multicast connection status confirmation apparatus according to claim 44, wherein one of said link connections is a link connection of by an inter-working function between a frame relay network and a cell relay network.

50. A multicast connection status confirmation apparatus according to claim 44, wherein the link connections of fixed connection include link connections of semi-fixed connection.

* * * * *